United States Patent
Jito et al.

(10) Patent No.: US 8,609,279 B2
(45) Date of Patent: Dec. 17, 2013

(54) LITHIUM SECONDARY BATTERY AND METHOD FOR PRODUCING SAME

(75) Inventors: Daizo Jito, Kobe (JP); Noriyuki Tamura, Kobe (JP); Nobuhiro Sakitani, Kobe (JP); Hiroshi Minami, Tokushima (JP); Hiromasa Yagi, Nishinomiya (JP); Maruo Kamino, Tokushima (JP); Katsunobu Sayama, Kobe (JP); Yoshio Kato, Kobe (JP); Shigeki Matsuta, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 2042 days.

(21) Appl. No.: 10/531,045

(22) PCT Filed: Jun. 3, 2004

(86) PCT No.: PCT/JP2004/007691
§ 371 (c)(1),
(2), (4) Date: Apr. 12, 2005

(87) PCT Pub. No.: WO2004/109839
PCT Pub. Date: Dec. 16, 2004

(65) Prior Publication Data
US 2006/0024588 A1    Feb. 2, 2006

(30) Foreign Application Priority Data

| Jun. 9, 2003 | (JP) | ................................. 2003-163692 |
| Dec. 26, 2003 | (JP) | ................................. 2003-432477 |
| Mar. 19, 2004 | (JP) | ................................. 2004-080919 |
| Apr. 28, 2004 | (JP) | ................................. 2004-132741 |

(51) Int. Cl.
*H01M 4/38* (2006.01)
*H01M 4/66* (2006.01)
*H01M 10/40* (2006.01)

(52) U.S. Cl.
USPC ......... 429/218.1; 429/199; 429/245; 429/332

(58) Field of Classification Search
None
See application file for complete search history.

(56) References Cited

U.S. PATENT DOCUMENTS

| 4,853,304 | A |   | 8/1989 | Ebner et al. ................... 429/192 |
| 5,681,357 | A | * | 10/1997 | Eschbach et al. ............ 29/623.5 |
| 6,235,427 | B1 |   | 5/2001 | Idota et al. ................. 429/218.1 |
| 6,887,511 | B1 |   | 5/2005 | Shima et al. .................... 427/58 |
| 2005/0100790 | A1 |   | 5/2005 | Ota et al. ................. 429/231.95 |

FOREIGN PATENT DOCUMENTS

| EP | 1231651 | * | 8/2002 |
| EP | 1 905 739 A1 | | 4/2008 |
| JP | 6-124700 A | | 5/1994 |
| JP | 6-150975 A | | 5/1994 |

(Continued)

OTHER PUBLICATIONS

The TRC News No. 103 (Apr. 2008) pp. 20-21 published by TORAY Research Center, Inc., and a partial English translation including an English translation of Figure 3.

(Continued)

*Primary Examiner* — John S Maples
(74) *Attorney, Agent, or Firm* — McDermott Will & Emery LLP

(57) ABSTRACT

A rechargeable lithium battery including a negative electrode made by depositing a noncrystalline thin film composed entirely or mainly of silicon on a current collector, a positive electrode and a nonaqueous electrolyte, characterized in that said nonaqueous electrolyte contains carbon dioxide dissolved therein.

22 Claims, 9 Drawing Sheets

(56) References Cited

FOREIGN PATENT DOCUMENTS

| | | | |
|---|---|---|---|
| JP | 7-176323 A | | 7/1995 |
| JP | 7-249431 A | | 9/1995 |
| JP | 8-64246 A | | 3/1996 |
| JP | 9-63649 A | | 3/1997 |
| JP | 10-40958 A | | 2/1998 |
| JP | 2000-311706 | * | 11/2000 |
| JP | 01-029913 | * | 4/2001 |
| JP | 2001-307771 A | | 11/2001 |
| JP | 2002-289177 A | | 10/2002 |
| JP | 2002-319431 A | | 10/2002 |
| JP | 2002-329502 A | | 11/2002 |
| JP | 03-007295 | * | 1/2003 |
| JP | 2003-7305 A | | 1/2003 |
| JP | 2003-17040 A | | 1/2003 |
| JP | 2003-86243 A | | 3/2003 |
| WO | 01/29913 A1 | | 4/2001 |
| WO | 02/058182 A1 | | 7/2002 |
| WO | 02/071512 A1 | | 9/2002 |
| WO | 2004/114453 A1 | | 12/2004 |

OTHER PUBLICATIONS

Journal of Nuclear Science and Technology, 19[7], pp. 563-570 (Jul. 1982).

* cited by examiner

PRIOR ART

PRIOR ART

FIG. 14
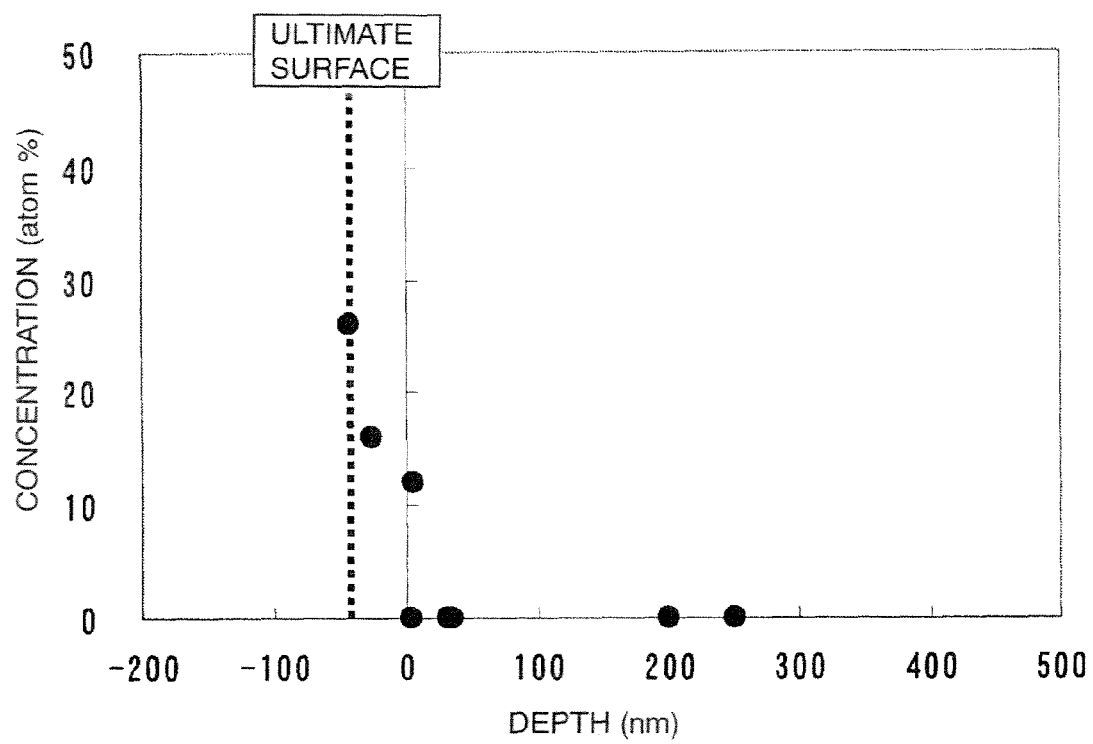
FIG. 15 PRIOR ART
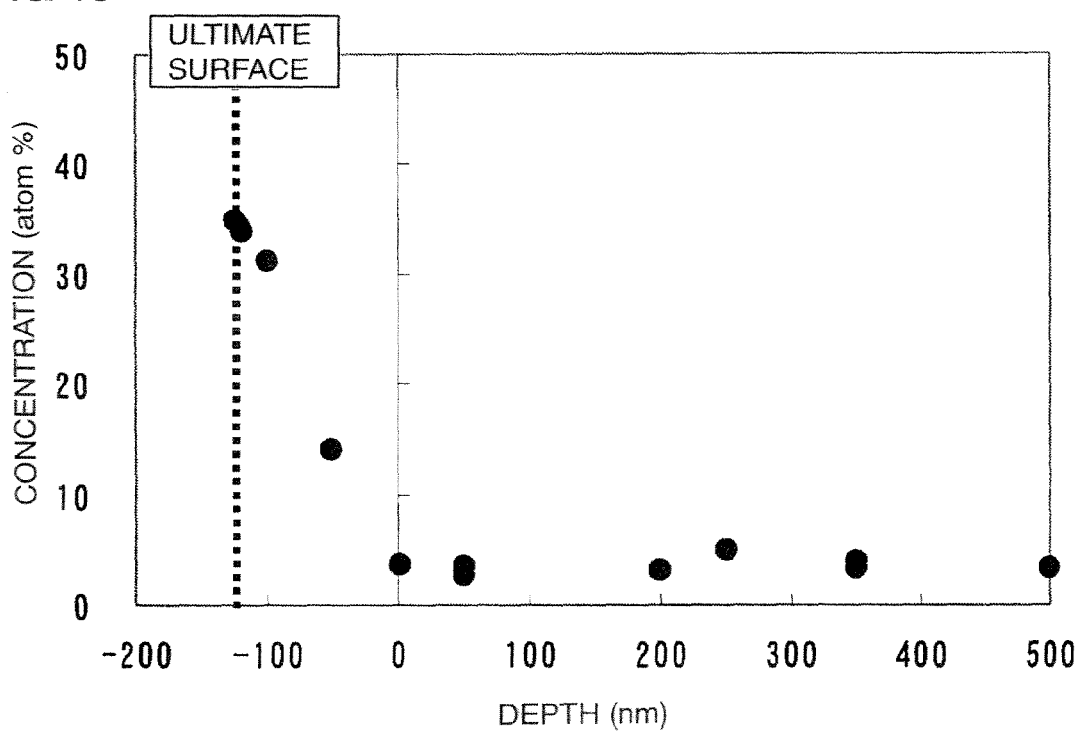

FIG. 16
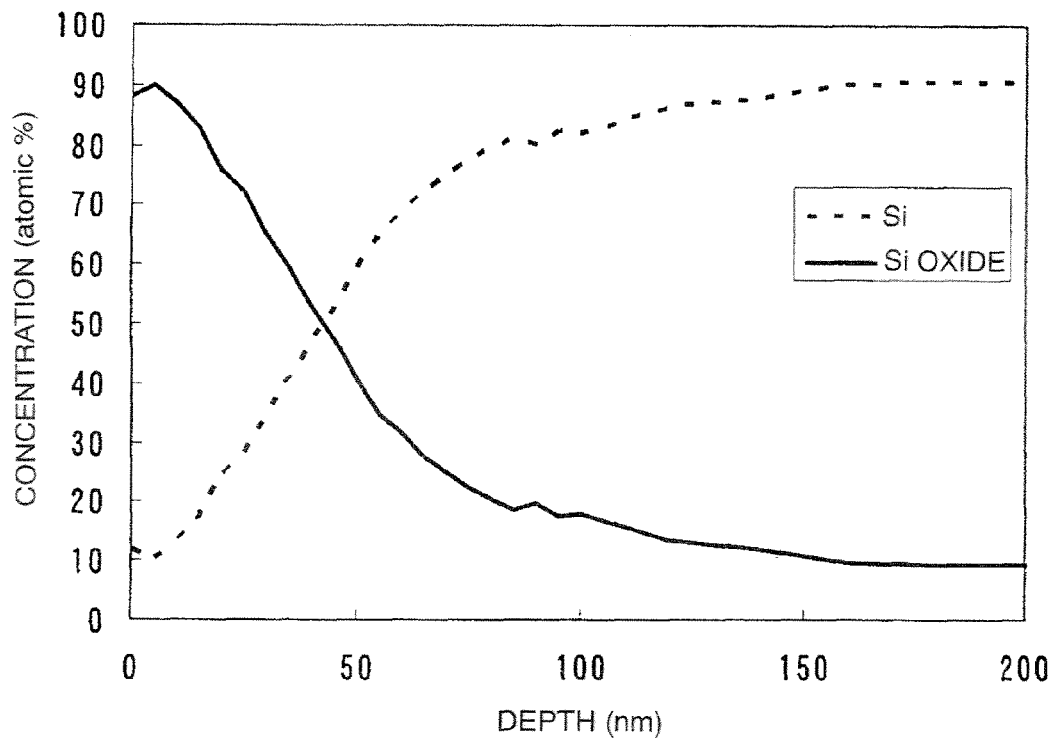
FIG. 17  PRIOR ART
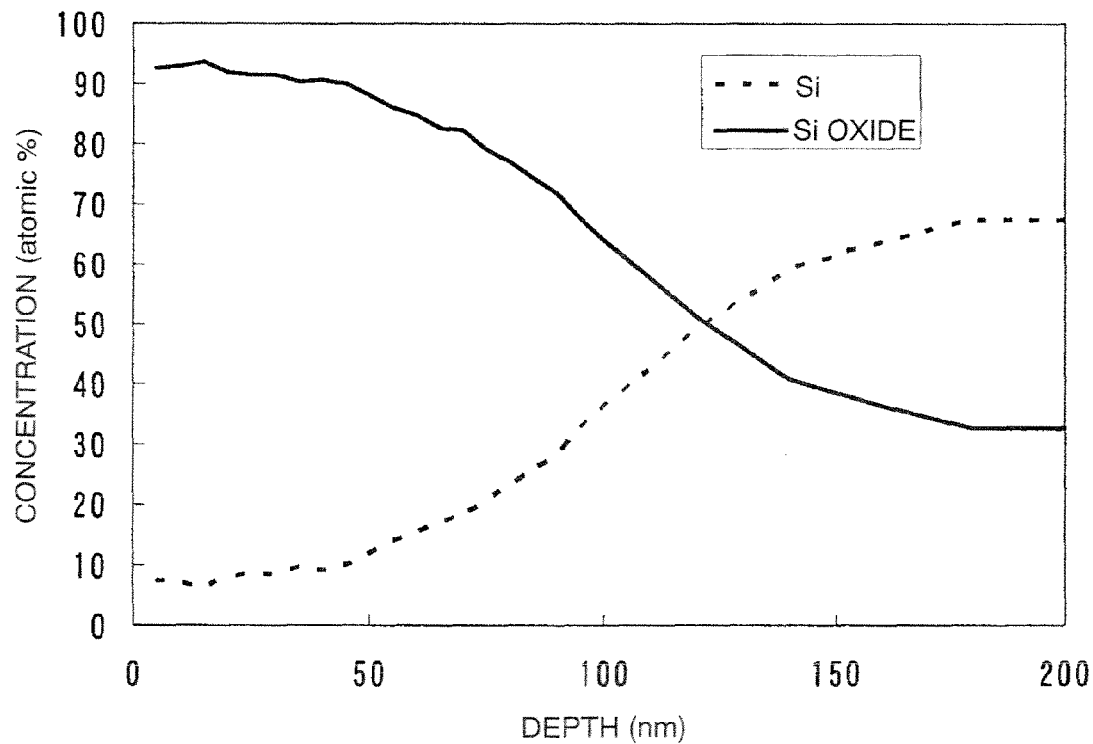

LITHIUM SECONDARY BATTERY AND METHOD FOR PRODUCING SAME

This application is a 371 of international application PCT/JP2004/007691, which claims priority based on Japanese patent application Nos. 2003-163692, 2003-432477, 2004-080919 and 2004-132741 filed Jun. 9, 2003, Dec. 26, 2003, Mar. 19, 2004, and Apr. 28, 2004, respectively, which are incorporated herein by reference.

TECHNICAL FIELD

The present invention relates to a rechargeable lithium battery and also to a method for fabrication thereof.

BACKGROUND ART

As one of new types of high-power and high-energy density rechargeable batteries, a rechargeable lithium battery has been recently utilized which is charged and discharged by the transfer of lithium ions through a nonaqueous electrolyte solution between the positive and negative electrodes.

For such a rechargeable lithium battery, a negative electrode using a lithium-alloying material, such as silicon, for the negative active material has been studied. However, in the case where the lithium-alloying material, such as silicon, is used as the active material of the negative electrode, the active material is powdered or falls off from the current collector during charge and discharge because the active material expands and shrinks in volume when it stores and releases lithium. This lowers the current-collecting capacity of the electrode and accordingly deteriorates charge-discharge cycle performance characteristics, which has been a problem.

The present applicant has proposed an electrode which uses silicon as active material and improves cycle performance characteristics of rechargeable lithium batteries (Patent Document 1). More specifically, the electrode has a noncrystalline silicon thin film deposited on a current collector by a thin film-forming method such as a sputtering, chemical vapor deposition (CVD process) or evaporation method. The present applicant has also proposed an electrode, for use in rechargeable lithium batteries, fabricated by incorporating cobalt or other element into silicon (Patent Document 2). For rechargeable lithium batteries using carbon material or metallic lithium as a negative active material, dissolving of carbon dioxide in nonaqueous electrolytes has been proposed (for example, Patent Documents 3-13).

Patent Document 1: PCT Int. Publication No. WO 01/29,913
Patent Document 2: PCT Int. Publication No. WO 02/071,512
Patent Document 3: U.S. Pat. No. 4,853,304
Patent Document 4: Japanese Patent Laid-Open No. Hei 6-150975
Patent Document 5: Japanese Patent Laid-Open No. Hei 6-124700
Patent Document 6: Japanese Patent Laid-Open No. Hei 7-176323
Patent Document 7: Japanese Patent Laid-Open No. Hei 7-249431
Patent Document 8: Japanese Patent Laid-Open No. Hei 8-64246
Patent Document 9: Japanese Patent Laid-Open No. Hei 9-63649
Patent Document 10: Japanese Patent Laid-Open No. Hei 10-40958
Patent Document 11: Japanese Patent Laid-Open No. 2001-307771
Patent Document 12: Japanese Patent Laid-Open No. 2002-329502
Patent Document 13: Japanese Patent Laid-Open No. 2003-86243

DISCLOSURE OF THE INVENTION

The rechargeable lithium battery using the thin film of noncrystalline silicon for the negative active material, as proposed by the present applicant, exhibits a high charge-discharge capacity and good cycle performance characteristics. However, the active material layer increases in porosity with repetitive charge-discharge cycling to result in increasing a thickness of the active material layer, which has been a problem.

It is an object of the present invention to provide a rechargeable lithium battery using a negative electrode made by depositing a noncrystalline thin film composed entirely or mainly of silicon on a current collector, which exhibits a high charge-discharge capacity and improved cycle characteristics and which can suppress increase in porosity and thickness of the active material after charges and discharges, as well as providing a method for fabrication thereof.

The rechargeable lithium battery of the present invention includes a negative electrode made by depositing a noncrystalline thin film composed entirely or mainly of silicon on a current collector, a positive electrode and a nonaqueous electrolyte. Characteristically, the nonaqueous electrolyte contains carbon dioxide dissolved therein.

In the present invention, the nonaqueous electrolyte contains carbon dioxide dissolved therein. This means that the nonaqueous electrolyte contains carbon dioxide purposely or intentionally dissolved therein. Although carbon dioxide inevitably dissolves in a nonaqueous electrolyte during a general fabrication process of rechargeable lithium batteries, such dissolved carbon dioxide is not meant to be included within the scope. Carbon dioxide generally dissolves into a solvent of a nonaqueous electrolyte. Accordingly, the nonaqueous electrolyte may be prepared by dissolving a solute and then carbon dioxide into a solvent. Alternatively, the nonaqueous electrolyte may be prepared by dissolving carbon dioxide and then a solute into a solvent.

A porosity increase of the active material layer, which occurs with a charge-discharge reaction, can be retarded by dissolving carbon dioxide in a nonaqueous electrolyte. A thickness increase of the active material layer during charge and discharge can be accordingly suppressed to result in the increased volumetric energy density of the rechargeable lithium battery.

As disclosed in Patent Document 1, the electrode using a noncrystalline thin film composed entirely or mainly of silicon as the active material is known to exhibit improved charge-discharge performance characteristics if the thin film is divided into columns by gaps formed therein in a manner to extend in a thickness direction of the thin film. The spaces defined to surround the columnar portions serve to accommodate a change in volume of the thin film that occurs when it expands and shrinks on charge and discharge and thereby suppress production of a stress, so that separation of the thin film from the current collector can be prevented. The gaps extending in the thickness direction of the thin film are formed to originate from valleys of the irregularities on a surface of the thin film.

The inventors of this application have found that, when such an electrode is repeatedly charged and discharged, the thin film having the laminar structure shows a gradual increase of porosity that advances inside from its surface. As the porosity increases, the thickness of the thin film increases. As a result, the volumetric energy density of the thin film decreases. This porosity increase of the thin film is believed due to the property change of the silicon active material that occurs as it undergoes an irreversible reaction.

Dissolving of carbon dioxide in a nonaqueous electrolyte, in accordance with the present invention, suppresses a porosity increase of the thin film. This accordingly suppresses a thickness increase and thereby increases a volumetric energy density of the thin film. The detailed reason why dissolving of carbon dioxide in a nonaqueous electrolyte results in retarding a porosity increase of the thin film is not clear, but is most probably due to the formation of a stable film having a high lithium-ion conducting capability on a surface of the thin film.

In the present invention, the amount of carbon dioxide dissolved in a nonaqueous electrolyte is preferably at least 0.001% by weight, more preferably at least 0.01% by weight, further preferably at least 0.1% by weight. It is generally preferred that carbon dioxide is dissolved in a nonaqueous electrolyte to saturation. The above-specified amount of dissolved carbon dioxide does not include the amount of carbon dioxide which inevitably dissolves in a nonaqueous electrolyte, i.e., excludes the amount of carbon dioxide which dissolves in a nonaqueous electrolyte during a general fabrication process of rechargeable lithium batteries. The above-specified amount of dissolved carbon dioxide can be determined by measuring a weight of a nonaqueous electrolyte both subsequent to and prior to dissolving of carbon dioxide therein. Specifically, it can be calculated using the following equation:

Amount of carbon dioxide dissolved in a nonaqueous electrolyte (weight %)=[(weight of the nonaqueous electrolyte after dissolving of carbon dioxide therein)−(weight of the nonaqueous electrolyte before dissolving of carbon dioxide therein)]/ (weight of the nonaqueous electrolyte after dissolving of carbon dioxide therein)×100.

In the present invention, the negative electrode made by depositing a noncrystalline thin film composed entirely or mainly of silicon on a current collector is used. The term noncrystalline, as used herein, is meant to encompass an amorphous film and a microcrystalline film having a crystallite size of up to 100 nm. Judgement of whether the thin film is amorphous and measurement of a crystallite size of the microcrystalline thin film can be made by observing the presence of a peak in an X-ray diffraction spectrum and applying a half band width of the peak to a Scherrer equation. As can be appreciated from the above definition, the noncrystalline thin film in the present invention does not include single crystal and polycrystalline thin films.

The noncrystalline thin film composed mainly of silicon refers to a noncrystalline alloy thin film containing at least 50 atomic % of silicon. Examples of such alloys include those containing silicon and at least one selected from cobalt, iron, zinc and zirconium. Specific examples include Si—Co, Si—Fe, Si—Zn and Si—Zr alloy thin films.

In the present invention, the current collector surface on which the thin film is deposited preferably has an arithmetic mean roughness Ra of at least 0.1 µm. The arithmetic mean roughness Ra is defined in Japanese Industrial Standards (JIS B 0601-1994) and can be measured as by a feeler-type surface roughness meter. Deposition of the thin film on the current collector having such large irregularities results in the formation of the corresponding irregularities on a surface of the deposited thin film. In the case where the noncrystalline thin film having such large irregularities is used as active material, when a battery is charged and discharged, a stress engendered due to expansion and shrinkage of the thin film concentrates at valleys of the irregularities of the thin film, so that gaps are formed in the thickness direction of the thin film to divide the thin film into columns, as described above. As a result, the stress produced on charge and discharge is dispersed to facilitate a reversible structural change of the noncrystalline thin film.

On the other hand, the thin film when divided into columns significantly increases its contact area with the nonaqueous electrolyte. As described above, a property change of the active material of the prior electrode has been found to start at a thin film surface in direct contact with the nonaqueous electrolyte and result in increasing a porosity of the thin film. The present invention can suppress such a porosity increase, improve charge-discharge cycle performance characteristics, suppress a thickness increase of the thin film and improve a volumetric energy density of a battery.

An upper limit of the arithmetic mean roughness Ra of the current collector surface is not particularly specified. However, its substantial value is preferably 10 µm or below because the thickness of the current collector is preferably in the range of 10-100 µm.

In the present invention, a heat-resisting copper alloy foil is preferably used for the current collector. The heat-resisting copper alloy, as used herein, refers to a copper alloy which exhibits a tensile strength of at least 300 MPa after one hour of annealing at 200° C. Examples of useful heat-resisting copper alloys are listed in Table 1.

TABLE 1

| Type | Composition (% on a Weight Basis) |
|---|---|
| Tin-Containing Copper | 0.05-0.2% Sn and 0.04% or Less P Added to Cu |
| Silver-Containing Copper | 0.08-0.25% Ag Added to Cu |
| Zirconium-Copper (Used in Examples) | 0.02-0.2% Zr Added to Cu |
| Chromium-Copper | 0.4-1.2% Cr Added to Cu |
| Titanium-Copper | 1.0-4.0% Ti Added to Cu |
| Beryllium-Copper | 0.4-2.2% Be, Slight Amounts of Co, Ni and Fe Added to Cu |
| Iron-Containing Copper | 0.1-2.6% Fe and 0.01-0.3% P Added to Cu |
| High-Strength Brass | 2.0% or Less Al, 3.0% or Less Mn and 1.5% or Less Fe Added to Brass of 55.0-60.5% Cu |
| Tin-Containing Brass | 80.0-95.0% Cu, 1.5-3.5% Sn and a Balance of Zn |
| Phosphor Bronze | Mainly of Cu and Containing 3.5-9.0% Sn and 0.03-0.35% P |
| Aluminum Bronze | Containing 77.0-92.5% Cu, 6.0-12.0% Al, 1.5-6.0% Fe, 7.0% or Less Ni and 2.0% or Less Mn |
| White Copper | Mainly of Cu and Containing 9.0-33.0% Ni, 0.40-2.3% Fe, 0.20-2.5% Mn and 1.0% or Less Zn |
| Corson Alloy | 3% Ni, 0.65% Si and 0.15% Mg in Cu |
| Cr—Zr—Cu Alloy | 0.2% Cr, 0.1% Zr and 0.2% Zn in Cu |

In the preparation of a negative electrode, a temperature change that occurs when the thin film is deposited on a current collector may reduce a mechanical strength of the current collector to the extent that makes succeeding processing difficult in the battery fabrication. The use of the heat-resisting copper alloy foil as the current collector prevents reduction in mechanical strength of the current collector that may be caused by the aforementioned temperature change and thereby insures sufficient conductivity of the current collector.

As described above, the current collector for use in the present invention preferably has large irregularities on its surface. Unless the arithmetic mean surface roughness Ra of the heat-resisting copper alloy foil is sufficiently large, an electrolytic copper or copper alloy may be superimposed on a surface of the foil to provide large irregularities on the surface. Such electrolytic copper and copper alloy layers can be formed through an electrolytic process.

The method of the present invention enables fabrication of the above-described rechargeable lithium battery of the present invention and is specifically for fabricating a rechargeable lithium battery including a negative electrode, a positive electrode and a nonaqueous electrolyte. The method is characterized as including the steps of depositing a noncrystalline thin film composed entirely or mainly of silicon on a current collector to prepare a negative electrode, dissolving carbon dioxide in a nonaqueous electrolyte, and assembling a rechargeable lithium battery using the negative electrode, positive electrode and nonaqueous electrolyte.

Various methods can be utilized to dissolve carbon dioxide in the nonaqueous electrolyte. For example, carbon dioxide is forced to contact with the nonaqueous electrolyte. Specifically, a carbon dioxide gas is blown into the nonaqueous electrolyte. This is an efficient and easy method resulting in obtaining the nonaqueous electrolyte containing dissolved carbon dioxide. Other useful methods include stirring the nonaqueous electrolyte under a carbon dioxide atmosphere, and contacting a high-pressure stream of carbon dioxide with the nonaqueous electrolyte. Alternatively, a carbon dioxide generator may be added to dissolve carbon dioxide in the nonaqueous electrolyte. Examples of carbon dioxide generators include polycarbonates and carbonates. Dry ice may also be used.

In the fabrication of a rechargeable lithium battery using the nonaqueous electrolyte containing dissolved carbon dioxide, it is preferred that the amount of carbon dioxide dissolved in the nonaqueous electrolyte is stably controlled. To this object, a rechargeable lithium battery is preferably assembled under the atmosphere including carbon dioxide. For example, a step of introducing the nonaqueous electrolyte containing dissolved carbon dioxide into the battery and the subsequent steps are preferably performed under the atmosphere including carbon dioxide. It is also preferred that, after being introduced into the battery, the nonaqueous electrolyte containing dissolved carbon dioxide is exposed to a high-pressure carbon dioxide atmosphere to stabilize the amount of dissolved carbon dioxide. The amount of carbon dioxide that can be dissolved to saturation varies with a temperature of the nonaqueous electrolyte. It is accordingly preferred that, in the fabrication steps, a control is provided to minimize a temperature variation of the rechargeable lithium battery.

In the fabrication method of the present invention, the negative electrode is prepared by depositing the noncrystalline thin film comprised entirely or mainly of silicon on the current collector. Preferably, a raw material is supplied from a vapor phase in the deposition of the noncrystalline thin film. This method allows nearly uniform deposition of the noncrystalline thin film on an irregular surface of the current collector and thus results in the formation of irregularities, on a surface of the noncrystalline thin film, which generally conform in shape to those on a surface of the underlying current collector. The raw material from a vapor phase can be deposited on the noncrystalline thin film, for example, by a sputtering, chemical vapor deposition or evaporation process. Particularly from a practical point of view, the use of the evaporation process is preferred for deposition of the noncrystalline thin film. The evaporation process, because of its high film-forming rate, is more suitable for electrode fabrication compared to the other processes.

In the rechargeable lithium battery of the present invention, preferably, the discharge capacity per unit volume of the negative electrode does not exceed 0.7 (mAh/cm$^2$μm). The electrode having such a discharge capacity can be prepared by depositing the noncrystalline thin film using a evaporation process. The discharge capacity per unit volume can be calculated by dividing a discharge capacity per unit area by a thickness of the noncrystalline thin film. The discharge capacity per unit volume is nearly equivalent to the amount of lithium that is stored and released from the active material. It is therefore believed that the lower the discharge capacity per unit volume, the smaller the volumetric change produced per unit volume of the active material to result in obtaining better cycle performance characteristics.

A solvent of the nonaqueous electrolyte for use in the rechargeable lithium battery of the present invention is not particularly specified in type but can be illustrated by a mixed solvent of cyclic carbonate and chain carbonate. Examples of cyclic carbonates include ethylene carbonate, propylene carbonate, butylene carbonate and vinylene carbonate. Examples of chain carbonates include dimethyl carbonate, methyl ethyl carbonate and diethyl carbonate. Also applicable is a mixed solvent which contains any of the above-listed cyclic carbonates and an ether solvent such as 1,2-dimethoxyethane or 1,2-diethoxyethane. In the case where acyclic carbonate having an unsaturated carbon bond, such as vinylene carbonate, is contained as a solvent, such a cyclic carbonate is preferably contained in the amount by weight of 0.1-10%, based on the total weight of the cyclic carbonate (excluding the cyclic carbonate having an unsaturated carbon bond) and the chain carbonate. Another example of the cyclic carbonate having an unsaturated carbon bond is vinylethylene carbonate.

A solute of the nonaqueous electrolyte can be illustrated by $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. Preferred for use as the solute are $LiXF_y$ (wherein X is P, As, Sb, B, Bi, Al, Ga or In; y is 6 if X is P, As or Sb and y is 4 if X is B, Bi, Al, Ga or In); lithium perfluoroalkylsulfonyl imide $LiN(C_mF_{2m+1}SO_2)(C_nF_{2n+1}SO_2)$ (wherein m and n are independently integers of 1-4); and lithium perfluoroalkylsulfonyl methide $LiN(C_pF_{2p+1}SO_2)(C_qF_{2q+1}SO_2)(C_rF_{2r+1}SO_2)$ (wherein p, q and r are independently integers of 1-4). Among them, the use of $LiPF_6$ is particularly preferred. Other applicable electrolytes include, for example, gelled polymer electrolytes comprised of an electrolyte solution impregnated into polymer electrolytes such as polyethylene oxide and polyacrylonitrile. The electrolyte for the rechargeable lithium battery of the present invention can be used without limitation, so long as a lithium compound as its solute that imparts ionic conductivity, as well as its solvent that dissolves and retains the lithium compound, remain undecomposed at voltages during charge, discharge and storage of the battery.

Also in the present invention, the nonaqueous electrolyte preferably contains a fluorine-containing compound or $LiClO_4$. Examples of such fluorine-containing compounds include $LiXF_y$ (wherein X is P, As, Sb, B, Bi, Al, Ga or In; y is 6 if X is P, As or Sb and y is 4 if X is B, Bi, Al, Ga or In) and $LiN(C_pF_{2p+1}SO_2)(C_qF_{2q+1}SO_2)(C_rF_{2r+1}SO_2)$ (wherein p, q and r are independently integers of 1-4), which are both useful as the aforementioned solute, and a fluorine-containing lithium borate. The fluorine-containing lithium borate can be illustrated by $LiBF_2(O_x)$.

Examples of useful positive electrode materials for the rechargeable lithium battery of the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$; and lithium-free metal oxides such as $MnO_2$. Other substances can also be used, without limitation, if they are capable of electrochemical lithium insertion and deinsertion.

In accordance with the present invention, a rechargeable lithium battery can be provided which has a high charge-discharge capacity and in which a porosity increase of the active material layer during charge and discharge can be suppressed and accordingly a thickness increase of the active material layer after charge and discharge can be suppressed.

BRIEF DESCRIPTION OF THE DRAWINGS

FIG. 14 is a graph showing an oxygen concentration at and near a thin film surface of the negative electrode of the rechargeable lithium battery A1 in accordance with the present invention;

FIG. 15 is a graph showing an oxygen concentration at and near a thin film surface of the negative electrode of the comparative battery B1;

FIG. 16 is a graph showing an Si concentration and an Si oxide concentration at and near a thin film surface of the negative electrode of the rechargeable lithium battery A1 in accordance with the present invention; and FIG. 17 is a graph showing an Si concentration and an Si oxide concentration at and near a thin film surface of the negative electrode of the comparative battery B1.

Figure 1:
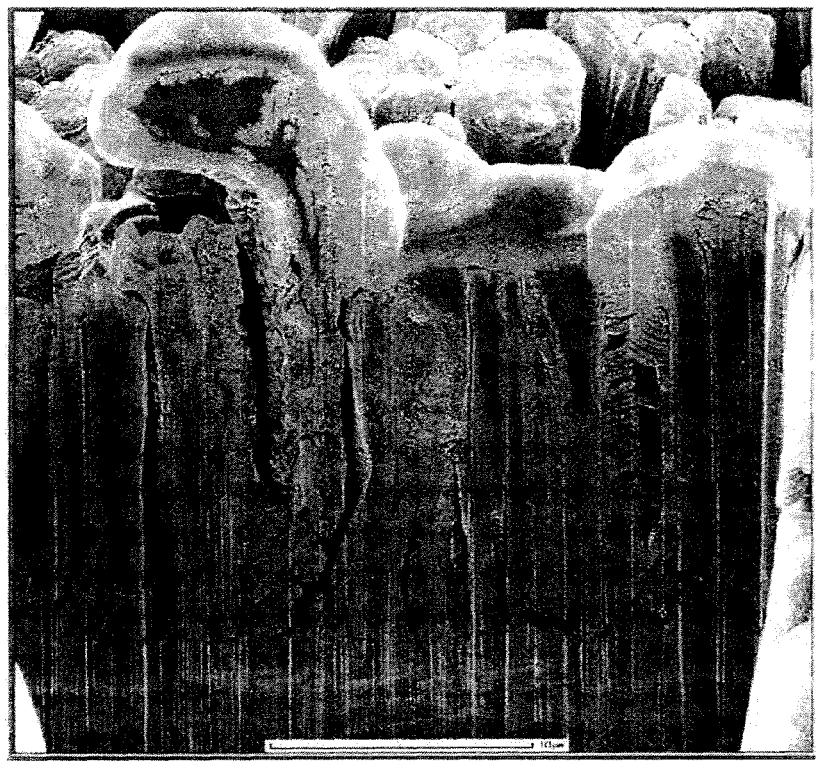
FIG. 1 is an FIB-SIM image showing a section of the negative electrode of the rechargeable lithium battery A1 in accordance with the present invention.

| EXPLANATION OF THE REFERENCE NUMERALS | |
|---|---|
| 1 | chamber |
| 2 | substrate holder |
| 3 | Si sputter source |
| 4 | DC pulse power source |
| 5 | plasma |
| 6 | gas inlet |
| 7 | gas outlet |
| 8 | Co sputter source |
| 9 | RF power source |
| 10 | outer casing |
| 11 | negative current collector |
| 12 | silicon thin film |
| 13 | positive current collector |
| 14 | positive active material layer |
| 15 | separator |
| 16 | nonaqueous electrolyte |
| 17 | negative tab |
| 18 | positive tab |
| 21 | electron-beam deposition apparatus |
| 22 | chamber |
| 23 | deposition source |
| 24 | rotary drum |
| 25 | radiation heat shielding plate |
| 26 | shutter |
| 27 | vacuum evacuation apparatus |
| 32 | current collector |
| 43 | beaker cell |
| 44 | work electrode |
| 45 | container |
| 46 | counter electrode |
| 47 | reference electrode |
| 48 | nonaqueous electrolyte solution |

BEST MODE FOR CARRYING OUT THE INVENTION

The present invention is below described in more detail by way of Examples. The following examples merely illustrate the practice of the present invention but are not intended to be limiting thereof. Suitable changes and modifications can be effected without departing from the scope of the present invention.

EXPERIMENT 1

(Preparation of Negative Electrode)

Copper was deposited by an electrolytic process on a surface of a heat-resisting, rolled copper alloy foil composed of a zirconium-copper alloy (zirconium content by weight of 0.015-0.03%) to provide a surface-roughened, heat-resisting copper alloy foil (having an arithmetic mean roughness Ra of 0.25 μm and a thickness of 31 μm) for use as a current collector. A noncrystalline silicon thin film was deposited on the current collector using the sputtering apparatus shown in FIG. 5.

Figure 5:
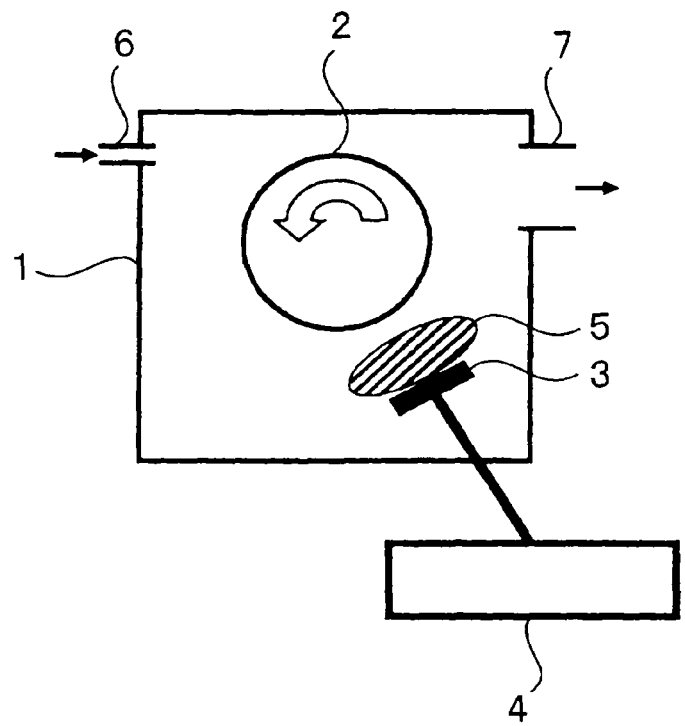
FIG. 5 is a schematic view, showing the sputtering apparatus employed in the Example in accordance with the present invention.

As shown in FIG. 5, a chamber 1 encloses a rotational cylindrical substrate holder 2. The current collector was mounted on a surface of the substrate holder 2. The chamber 1 also encloses an Si sputter source 3 to which a DC pulse power source 4 is connected. The chamber 1 is provided with a gas inlet 6 for introducing an Ar gas and a gas outlet 7 for evacuating an interior of the chamber 1.

The interior of the chamber was vacuum evacuated through the gas outlet 7 to $1 \times 10^{-4}$ Pa. An Ar gas was then introduced through the gas inlet 6 into the interior of the chamber 1. After a gas pressure was stabilized, a direct current pulse from the DC pulse power source 4 was applied to the Si sputter source 3 to produce a plasma 5, so that a noncrystalline silicon film was deposited on the current collector mounted on a surface of the substrate holder 2. The specific conditions for deposition of the thin film are listed in Table 2.

TABLE 2

| | |
|---|---|
| DC Pulse Frequency | 100 kHz |
| DC Pulse Width | 1856 ns |
| DC Pulse Power | 2000 W |
| Argon Flow Rate | 60 sccm |
| Gas Pressure | $2\text{-}2.5 \times 10^{-1}$ Pa |
| Deposition Time | 146 min. |
| Film Thickness | 5 μm |

After the thin film was deposited to a thickness of 5 μm, the current collector was removed from the substrate holder 2. The current collector while carrying the thin film thereon was cut into a 2.5 cm×2.5 cm size. A negative tab was attached thereto to prepare a negative electrode.

(Preparation of Positive Electrode)

90 parts by weight of $LiCoO_2$ powder and 5 parts by weight of artificial graphite powder as a conductor were mixed in a 5 wt. % N-methylpyrrolidone aqueous solution containing 5 parts by weight of polytetrafluoroethylene as a binder to provide a cathode mix slurry. This slurry was coated by a doctor blade process onto a 2 cm×2 cm surface region of an aluminum foil (18 μm thick) as a positive current collector and then dried to form a layer of positive active material. A positive tab was attached onto an aluminum foil region left uncoated with the positive active material layer to prepare a positive electrode.

(Preparation of Nonaqueous Electrolyte)

1 mole/liter of $LiPF_6$ was dissolved in a mixed solvent containing ethylene carbonate and diethyl carbonate at a 3:7 ratio by volume to prepare a nonaqueous electrolyte b1.

20 weight % of vinylene carbonate was added to this nonaqueous electrolyte b1 to prepare a nonaqueous electrolyte b2.

Carbon dioxide was blown for 30 minutes into the nonaqueous electrolyte b1 at 25° C. until carbon dioxide was dissolved therein to saturation. This resulted in obtaining a nonaqueous electrolyte a1. A weight of the nonaqueous electrolyte both after and before dissolving of carbon dioxide was measured and, as a result, the amount of dissolved carbon dioxide was determined to be 0.37 weight %.

The nonaqueous electrolytes a1, b1 and b2 are clarified as follows:

nonaqueous electrolyte a1: a nonaqueous electrolyte in which $CO_2$ was dissolved nonaqueous electrolyte b1: a nonaqueous electrolyte in which $CO_2$ was not dissolved nonaqueous electrolyte b2: a nonaqueous electrolyte to which 20% by weight of vinylene carbonate (VC) was added.

(Fabrication of Battery)

Figure 6:
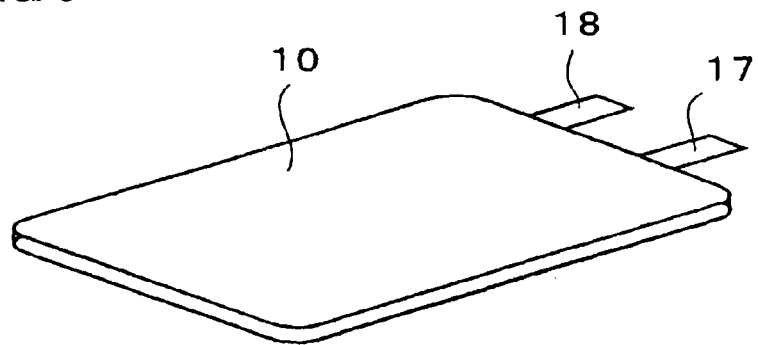
FIG. 6 is a perspective view, showing the rechargeable lithium battery fabricated in the Example in accordance with the present invention.
Figure 7:
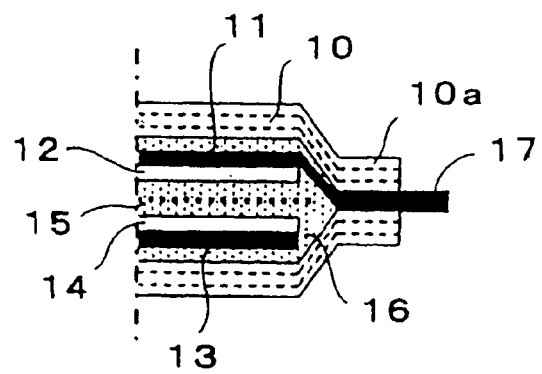
FIG. 7 is a schematic sectional view, showing the rechargeable lithium battery fabricated in the Example in accordance with the present invention.

A rechargeable lithium battery was fabricated using the above-prepared negative electrode, positive electrode and nonaqueous electrolyte. FIGS. 6 and 7 are a perspective view and a schematic sectional view, respectively, showing the fabricated rechargeable lithium battery. As shown in FIG. 7, the positive and negative electrodes are inserted in an outer casing 10 made of an aluminum laminated film. The silicon thin film 12 as the negative active material is provided on a negative current collector 11. The positive active material layer 14 is provided on a positive current collector 13. The silicon thin film 12 and the positive active material layer 14 are located to face toward the opposite sides of a separator 15. The nonaqueous electrolyte 16 is introduced in the outer casing 10. The outer casing 10 is welded at its ends to define a sealed portion 10a. A negative tab 17 is attached to the negative current collector 11 such that its leading end extends through the sealed portion 10a to an outside. Although not shown in FIG. 7, a positive tab 18 is attached to the positive current collector 13 such that its leading end also extends through the sealed portion 10a to an outside.

The battery fabricated using the nonaqueous electrolyte a1 was designated as A1. The battery fabricated using the nonaqueous electrolyte b1 was designated as B1. The battery fabricated using the nonaqueous electrolyte b2 was designated as B2. Fabrication of the rechargeable lithium battery A1 was performed in the high-purity carbon dioxide gas atmosphere.

(Charge-Discharge Cycle Test)

The thus-fabricated rechargeable lithium batteries A1, B1 and B2 were subjected to a charge-discharge cycle test. Each battery at 25° C. was charged at a current of 13 mA to 4.2 V and then discharged at a current of 13 mA to 2.75 V. This was recorded as a unit cycle of charge and discharge. The maximum discharge capacity and the 100th-cycle and 200th-cycle discharge capacities and capacity retention rates, for each battery, are listed in Table 3. The maximum discharge capacity is the highest discharge capacity among those measured for all cycles. The capacity retention rate is calculated by taking the maximum discharge capacity as being 100%.

TABLE 3

| Battery | Maximum Discharge Capacity (mAh) | on 100-th Cycle | | on 200-th Cycle | |
|---|---|---|---|---|---|
| | | Discharge Capacity (mAh) | Capacity Retention (%) | Discharge Capacity (mAh) | Capacity Retention (%) |
| A1 | 11.17 | 9.89 | 88.5 | 8.66 | 77.5 |
| B1 | 12.17 | 2.14 | 17.6 | 0.58 | 4.8 |
| B2 | 11.42 | 8.41 | 73.6 | 5.33 | 46.7 |

As can be clearly seen from Table 3, the battery A1 containing dissolved carbon dioxide in the nonaqueous electrolyte, in accordance with the present invention, shows a significant capacity retention improvement, compared to the battery B1 including the nonaqueous electrolyte in which carbon dioxide was not dissolved. Also, the battery A1 according to the present invention exhibits significantly improved capacity retention rate, compared to the battery B2 containing vinylene carbonate.

After 200 charge-discharge cycles, each battery was disassembled and its negative electrode was removed. A section of the negative electrode was observed using an SEM (scanning electron microscope) to measure a thickness of the noncrystalline silicon thin film. The thickness measured for the noncrystalline silicon thin film is shown in Table 4. In Table 4, the discharge capacity integrated over 200 cycles is also shown. The integrated discharge capacity is nearly proportional to the reacting weight of lithium that is stored and released from the noncrystalline silicon thin film. It is therefore believed that the integrated discharge capacity is closely related to a progress of a porosity increasing reaction that increases a thickness of the noncrystalline silicon thin film.

TABLE 4

| Battery | Integrated Discharge Capacity (mAh) | Thickness of Noncrystalline Silicon Thin Film (μm) |
| --- | --- | --- |
| A1 | 1949 | 25 |
| B1 | 851 | 22 |
| B2 | 1657 | 42 |

As can be clearly seen from the results shown in Table 4, the noncrystalline silicon thin film in the battery A1 according to the present invention exhibits a much higher integrated discharge capacity than that in the battery B1, although a difference in thickness therebetween is very small. The battery B2 using the nonaqueous electrolyte containing vinylene carbonate exhibits a higher integrated discharge capacity than the battery B1 but shows a large thickness increase of the amorphous silicon thin film. It is reported that, for rechargeable lithium batteries using a carbon-based negative electrode, addition of vinylene carbonate to a nonaqueous electrolyte improves cycle characteristics as a result of formation of a film on a surface of the negative electrode. However, the addition of vinylene carbonate does not lead to virtually suppressing a thickness increase of the silicon thin film, as apparent from the comparative examples. On the other hand, the increase in thickness of the noncrystalline thin film is apparently suppressed in the rechargeable lithium battery using the nonaqueous electrolyte containing dissolved carbon dioxide in accordance with the present invention.

(FIB-SIM Observation)

After 200 charge-discharge cycles under the same cycling conditions as specified above, the battery A1 was disassembled to remove its negative electrode. After 100 charge-discharge cycles under the same cycling conditions as specified above, the battery B2 was disassembled to remove its negative electrode. A section of each negative electrode was observed with an FIB-SIM. By the FIB-SIM observation, it is meant that the negative electrode is processed with a focused ion beam (FIB) so that its section is exposed to an outside, and then the exposed section is observed with a scanning ion microscope (SIM).

In the SIM observation, the exposed section is observed from above and at an angle of 45 degrees with respect to the exposed section.

Figure 2:
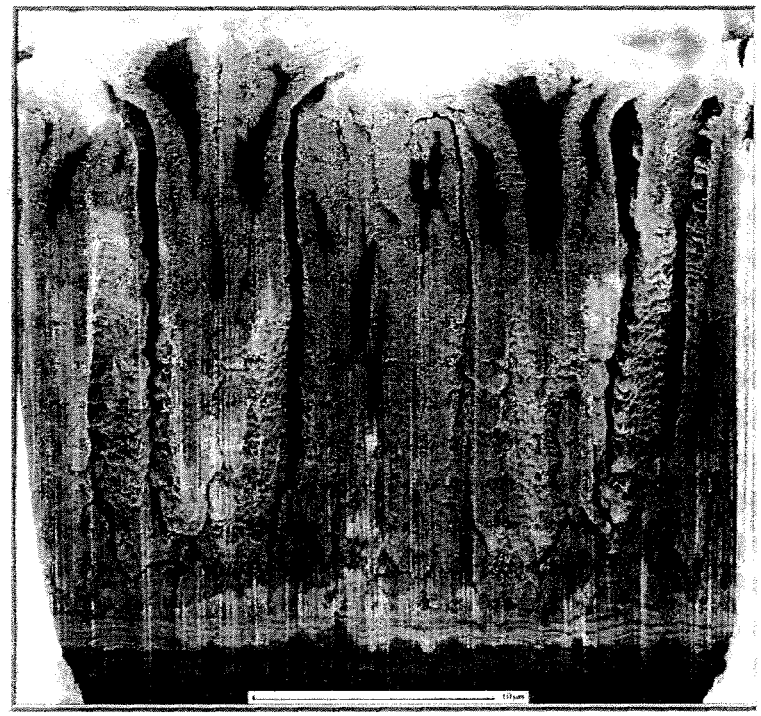
FIG. 2 is an FIB-SIM image showing a section of the negative electrode of the comparative battery B2.

FIGS. 1 and 2 show SIM images, respectively.

FIG. 1 shows the negative electrode of the battery A1 and FIG. 2 shows the negative electrode of the battery B2. As can be clearly seen from FIG. 2, in the negative electrode which showed a thickness increase as related to the addition of vinylene carbonate, a surface portion of each column of the thin film appears white due to the presence of pores. The upper inner portion of the thin film appears partly darkened due to the absence of pores. However, the thin film portion in the vicinity of the current collector appear mostly white. This demonstrates that the thin film has a markedly high degree of porosity at its portion adjacent to the current collector.

On the other hand, in the negative electrode of the rechargeable lithium battery using the nonaqueous electrolyte containing dissolved carbon dioxide in accordance with the present invention, a portion of the thin film that appears white due to the presence of pores is very small, as can be seen from FIG. 1. Particularly, the negative electrode is found to have a very low porosity at its portion adjacent to the current collector.

(TEM Observation)

After 50 charge-discharge cycles under the same charge and discharge conditions as specified above, the battery A1 was disassembled in the argon atmosphere to remove its negative electrode. After 30 charge-discharge cycles under the same charge and discharge conditions as specified above, the battery B2 was disassembled in the argon atmosphere to remove its negative electrode.

Figure 12:
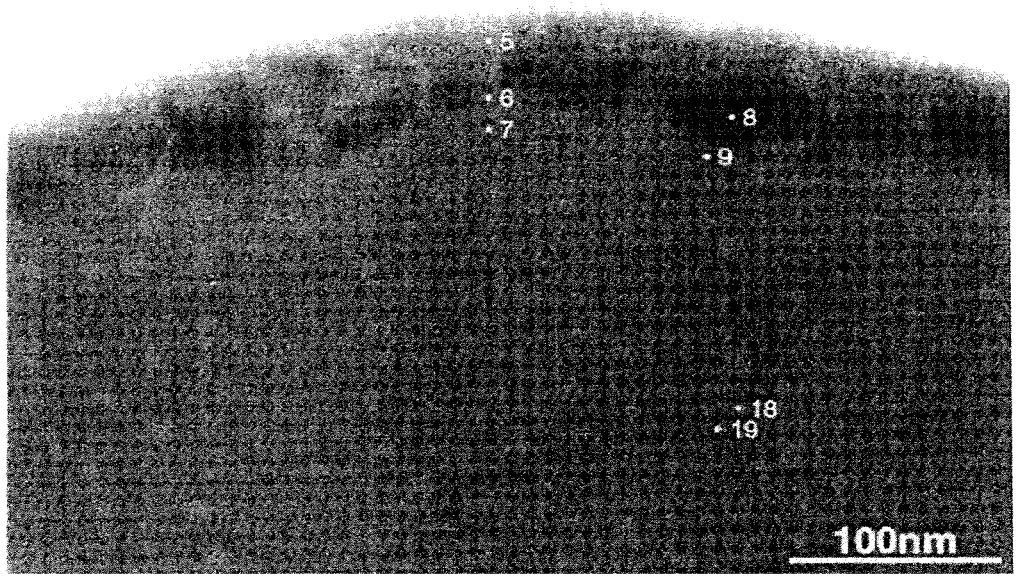
FIG. 12 is a TEM image showing the vicinity of a thin film surface of the negative electrode of the rechargeable lithium battery A1 in accordance with the present invention.
Figure 13:
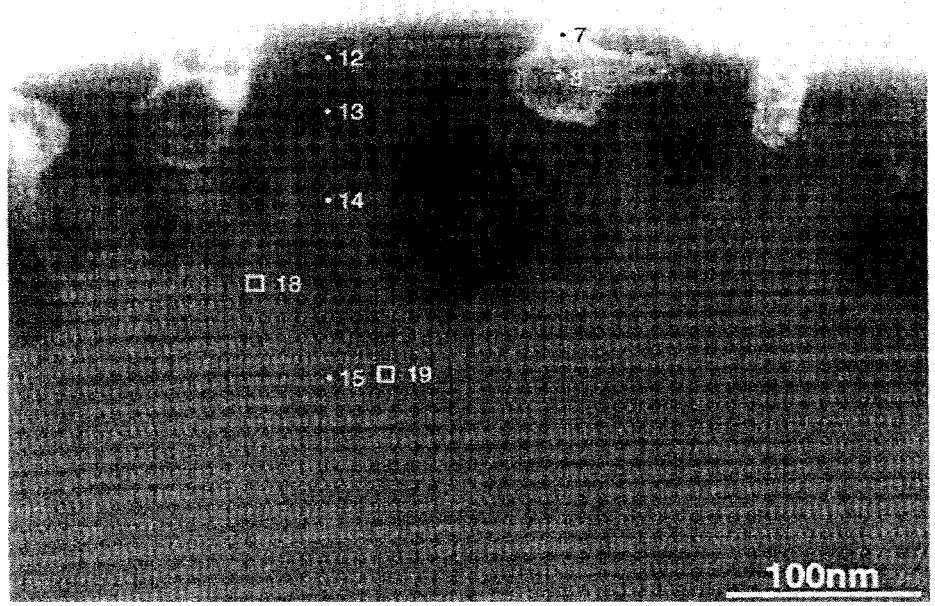
FIG. 13 is a TEM image showing the vicinity of a surface of the negative electrode thin film of the comparative battery B1.

Each of the removed negative electrodes was processed into the form of a thin section, and a distal end of the columnar structure of the negative electrode thin film was observed with a transmission electron microscope (TEM). FIG. 12 shows a TEM image of the negative electrode of the battery A1 and FIG. 13 shows a TEM image of the negative electrode of the battery B1. In FIGS. 12 and 13, an entire black region, including dark and light regions, indicates a section of the thin film in the negative electrode. An upper end of the black region, i.e., a boundary of the black and white regions indicates an ultimate surface of the thin film in the negative electrode or a contact surface with the nonaqueous electrolyte. As apparent from FIGS. 12 and 13, a dark region is observed near the thin film surface of the negative electrode. This dark region is about 50 nm thick for the battery A1 and about 150 nm thick for the battery B1. Thus, the negative electrode thin film of the battery A1 in accordance with the present invention has a thinner dark region than that of the battery B1.

For the batteries A1 and B1, the thin film surface of each negative electrode was analyzed by energy dispersive X-ray spectroscopy (EDX). FIG. 14 shows an oxygen concentration at and near the surface of the negative electrode thin film of the battery A1. FIG. 15 shows an oxygen concentration at and near the surface of the negative electrode thin film of the battery B1. In FIGS. 14 and 15, the vertical line at the depth of 0 nm indicates a boundary between the dark region and the light region. As can be clearly seen from FIGS. 14 and 15, a negative electrode region having a high oxygen concentration for the battery A1 is smaller in thickness than for the battery B1.

For the batteries A1 and B1, the thin film of each negative electrode was at its surface portion etched by an Ar (argon) ion and its composition along the depth of the surface portion was analyzed by X-ray photoelectron spectroscopy. FIG. 16 shows an Si concentration and an Si oxide concentration at and near the surface of the negative electrode thin film of the battery A1. FIG. 17 shows an Si concentration and an Si oxide concentration at and near the surface of the negative electrode thin film of the battery B1. As can be clearly seen from FIGS. 16 and 17, the Si oxide exists in a large quantity over a thinner region in the surface portion of the negative electrode of the battery A1 than in the surface portion of the negative electrode of the battery B1, demonstrating that the oxidation reaction of Si is retarded in the battery A1.

As can be appreciated from the preceding results, the nonaqueous electrolyte, if containing dissolved carbon dioxide, retards oxidation of Si that occurs during charge and discharge. In the battery B1, oxidation of Si proceeds significantly. This appears to increase a porosity of the silicon thin film and expand its volume. It is believed that such oxidation of silicon and porosity increase inside the silicon thin film can be retarded by dissolving carbon dioxide in the nonaqueous electrolyte in accordance with the present invention.

As can be appreciated from the above, dissolving of carbon dioxide in the nonaqueous electrolyte, in accordance with the present invention, results in retarding increase in porosity of the thin film and accordingly suppressing increase in thickness of the noncrystalline silicon thin film.

(TOF-SIMS Observation)

Figure 3:
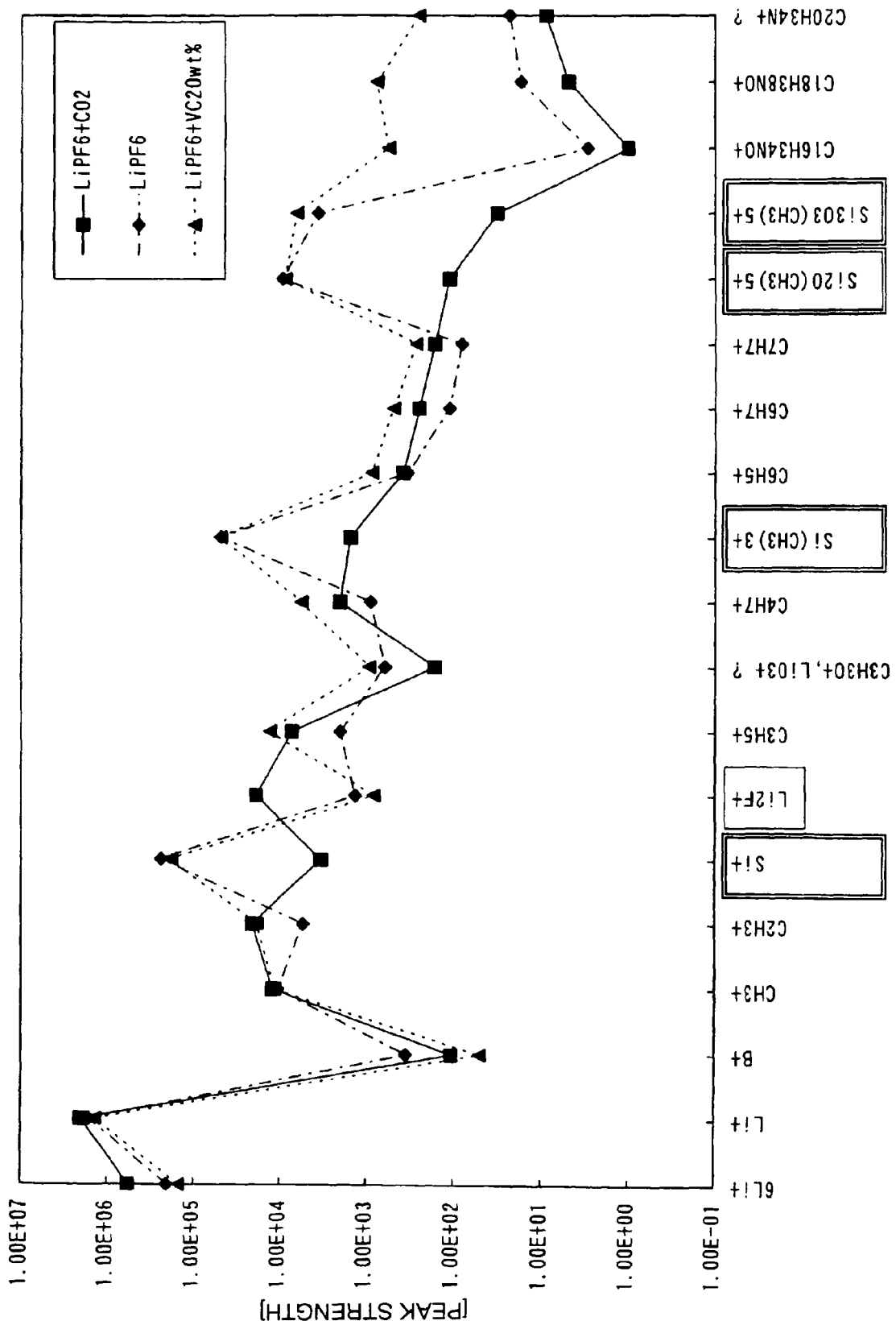
FIG. 3 is a spectrum showing the TOF-SIMS surface analysis results (positive ions) for the negative electrode.
Figure 4:
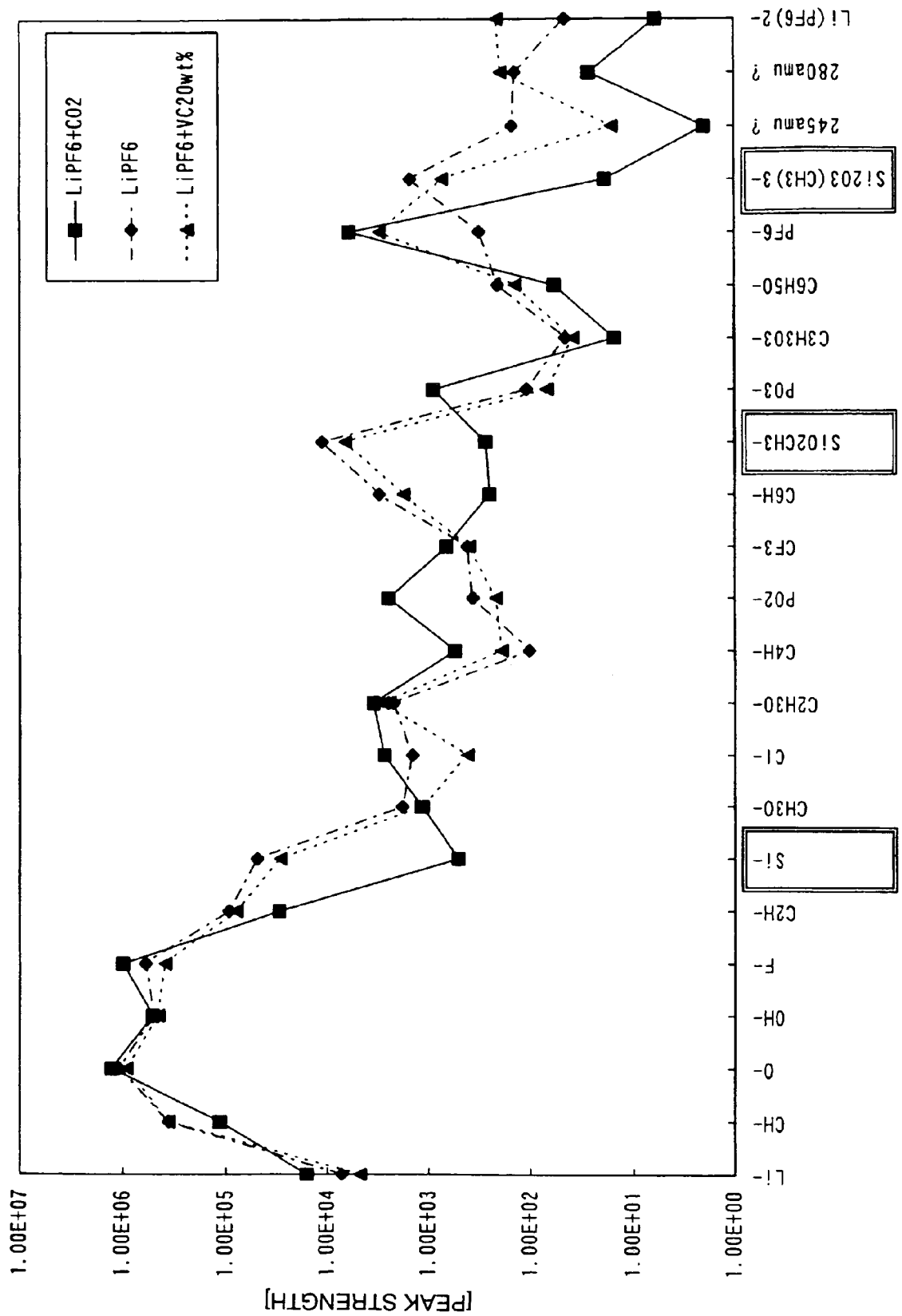
FIG. 4 is a spectrum showing the TOF-SIMS surface analysis results (negative ions) for the negative electrode.

For the initially-charged batteries A1, B1 and B2, a surface of each negative electrode was analyzed by TOF-SIMS (time of flight-secondary ion mass spectrometry). FIG. 3 is a positive ion TOF-SIMS spectrum and FIG. 4 is a negative ion TOF-SIMS spectrum. In FIGS. 3 and 4, "LiPF6+CO2" shows a spectrum for the battery A1 of the present invention, "LiPF6" shows a spectrum for the battery B1 and "LiPF6+VC20 wt %" shows a spectrum for the battery B2.

As can be clearly seen from FIGS. 3 and 4, the markedly reduced Si ion and Si-containing ions and the increased $Li_2F^+$ ion at the surface of the negative electrode, relative to the batteries B1 and B2, are detected for the battery A1 in accordance with the present invention. This demonstrates that the use of the nonaqueous electrolyte containing dissolved carbon dioxide, in accordance with the present invention, results in the marked reduction in concentration of Si at the thin film surface. This is most probably due to the formation of an Si-free film on the surface of the thin film composed of active material. It is believed that this film is a stable film having a high lithium-ion conducting capability and that the formation of such a film on the thin film surface suppresses property change of the thin film and retards porosity increase of the thin film in a charge-discharge process during which lithium is stored and released from the thin film.

On the other hand, it is very likely that a film containing an Si active material is formed in the negative electrode for the batteries B1 and B2. The formation of such a film may be a probable cause of porosity increase at the surface of the active material. It is believed that the present invention prevents formation of such a film to successfully retard porosity increase of the active material.

REFERENCE EXPERIMENT (Preparation of Carbon Negative Electrode)

Artificial graphite as a negative active material and a styrene-butadiene rubber as a binder were mixed in an aqueous solution of carboxymethylcellulose as a thickener so that the mixture contained the active material, binder and thickener in the ratio by weight of 95:3:2. The mixture was then kneaded to prepare a negative electrode slurry. The prepared slurry was applied onto a copper foil as a current collector, dried and rolled by a pressure roll. Subsequent attachment of a current collecting tab resulted in the preparation of a negative electrode.

(Preparation of Positive Electrode)

90 parts by weight of $LiCoO_2$ powder and 5 parts by weight of artificial graphite powder as an electric conductor were mixed in a 5 wt. % N-methylpyrrolidone aqueous solution containing 5 parts by weight of polytetrafluoroethylene as a binder to provide a cathode mix slurry. This slurry was coated by a doctor blade process on an aluminum foil as a positive current collector and then dried to form a layer of positive active material. A positive tab was attached onto an aluminum foil region left uncoated with the positive active material layer to prepare a positive electrode.

(Preparation of Nonaqueous Electrolyte)

1 mole/liter of $LiPF_6$ was dissolved in a mixed solvent containing ethylene carbonate and diethyl carbonate at a 3:7 ratio by volume to prepare a solution.

Vinylene carbonate was added to this solution in the amount of 2 weight % to prepare a nonaqueous electrolyte c2.

Carbon dioxide was blown for 30 minutes into the nonaqueous electrolyte c2 at 25° C. until carbon dioxide was dissolved therein to saturation. As a result, a nonaqueous electrolyte c1 was obtained. The amount of dissolved carbon dioxide was 0.37 weight %.

The nonaqueous electrolytes c1 and c2 are clarified as follows:

nonaqueous electrolyte c1: a nonaqueous electrolyte in which $CO_2$ was dissolved nonaqueous electrolyte c2: a nonaqueous electrolyte in which $CO_2$ was not dissolved.

(Fabrication of Batteries)

Rechargeable lithium batteries were fabricated using the above-prepared negative electrode, positive electrode and nonaqueous electrolytes.

The positive and negative electrodes were rolled up in a cylindrical configuration with a porous polyethylene separator between them. This electrode group and each nonaqueous electrolyte were inserted in an outer casing made of an aluminum laminate. The outer casing was heat sealed at its peripheries such that leading ends of the positive and negative current collecting tabs extended outwardly from the outer casing, thereby completing fabrication of the battery.

The particulars of the fabricated batteries are listed in Table 5.

TABLE 5

| | |
|---|---|
| Thickness (mm) | 3.6 |
| Width (mm) | 35 |
| Height (mm) | 62 |
| Designed Capacity (mAh) | 600 |
| Number of Turns | 9 |
| Thickness of Negative Active Material Layer (μm) | 53.5 |

The battery fabricated using the nonaqueous electrolyte c1 was designated as C1. The battery fabricated using the nonaqueous electrolyte c2 was designated C2. Fabrication of the battery C1 was performed in the high-purity carbon dioxide gas atmosphere.

(Charge-Discharge Cycle Test)

The thus-fabricated rechargeable lithium batteries C1 and C2 were subjected to a charge-discharge cycle test. Each battery at 25° C. was charged at a constant current of 600 mA to 4.2 V, charged at a constant voltage of 4.2 V to 30 mA and then discharged at a current of 600 mA to 2.75 V. This was recorded as a unit cycle of charge and discharge. The 500th-cycle discharge capacity was divided by the 1st-cycle discharge capacity to give a capacity retention rate as shown in Table 6. Table 6 also shows a thickness increase of the battery after 500 cycles and a thickness increase of the active material per layer of the electrode as calculated from the value for the thickness increase of the battery.

TABLE 6

| Battery | Capacity Retention After 500 Cycles (%) | Thickness Increase of Battery After 500 Cycles (μm) | Thickness Increase of Active Material Layer Per Layer of Electrode (μm) |
|---|---|---|---|
| C1 | 88.9 | 148 | 8 |
| C2 | 88.2 | 150 | 8 |

As can be clearly seen from the results shown in Table 6, dissolving of carbon dioxide in a nonaqueous electrolyte is little effective to retard deterioration of cyclic performance and suppress increase in thickness of the battery using a carbon material as the negative active material.

EXPERIMENT 2

(Preparation of Negative Electrode a3)

Copper was deposited by an electrolytic process on a surface of a heat-resisting, rolled copper alloy foil composed of a zirconium-copper alloy (zirconium content by weight of 0.03%) to provide a surface-roughened, heat-resisting copper alloy foil (having an arithmetic mean roughness Ra of 0.25 μm and a thickness of 26 μm) for use as a current collector. An amorphous silicon thin film was deposited on the current collector under the conditions specified in Table 7. In this experiment, a direct current pulse is supplied to initiate sputtering. However, film deposition can also be effected under the similar conditions by direct current or radio-frequency sputtering. In Table 7, sccm is a unit of flow rate and is an abbreviation of standard cubic centimeter per minute.

TABLE 7

| | |
| --- | --- |
| DC Pulse Frequency | 100 kHz |
| DC Pulse Width | 1856 ns |
| DC Pulse Power | 2000 W |
| Argon Flow Rate | 60 sccm |
| Gas Pressure | $2.0$-$2.5 \times 10^{-1}$ Pa |
| Forming Time | 146 min. |
| Film Thickness | 5 μm |

The obtained thin film was cut into a 25 mm×25 mm size to use as a negative electrode a3.

(Preparation of Negative Electrode a4)

Figure 8:
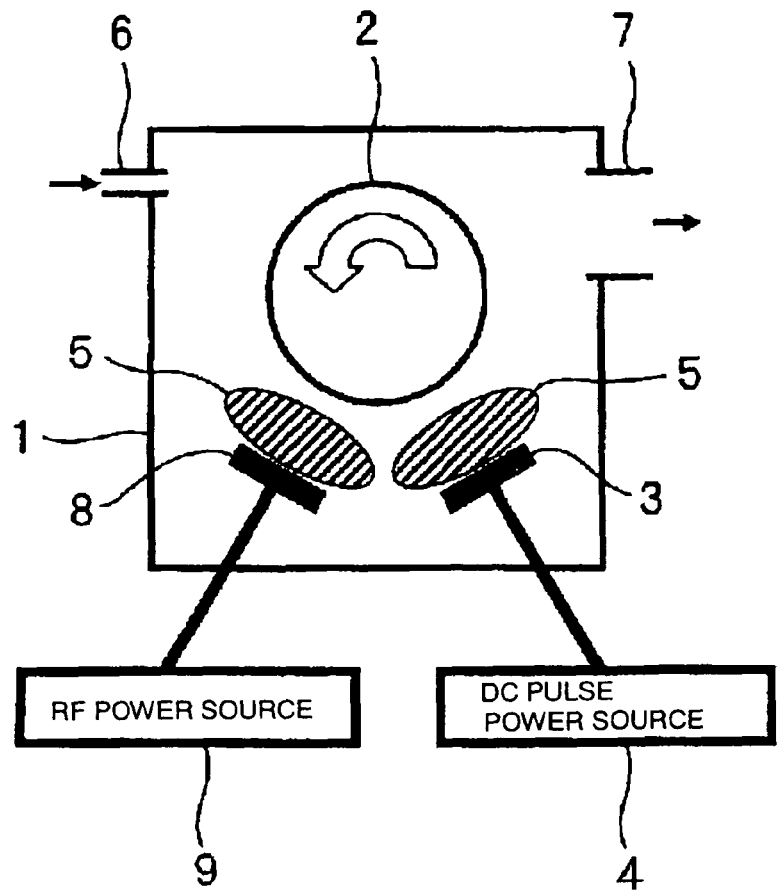
FIG. 8 is a schematic view, showing the dual source sputtering apparatus employed in the Example in accordance with the present invention.

An amorphous Si—Co alloy thin film was deposited on the same current collector as used in the preparation of the negative electrode a3, using the dual source sputtering apparatus shown in FIG. 8, wherein a direct current pulse and a radio-frequency were applied to an Si target and a Co target, respectively. Particular deposition conditions are listed in Table 8.

In the sputtering apparatus shown in FIG. 8, a chamber 1 encloses a rotational cylindrical substrate holder 2. The current collector was mounted on a surface of the substrate holder 2. The chamber 1 also encloses an Si sputter source 3 to which a DC pulse power source 4 is connected. The chamber 1 also encloses a Co sputter source 8 to which an RF power source 9 is connected. The chamber 1 is provided with a gas inlet 6 through which an Ar gas is introduced and a gas outlet 7 from which an interior of the chamber 1 is evacuated.

After a gas pressure inside the chamber 1 was stabilized, a direct current pulse from the DC pulse power source 4 was applied to the Si sputter source 3, while a radio-frequency from the RF power source 9 was applied to the Co sputter source 8, to produce their respective plasmas 5, so that a noncrystalline Si—Co alloy thin film was deposited on the current collector mounted on a surface of the substrate holder 2. The specific deposition conditions are shown in Table 8.

TABLE 8

| | | |
| --- | --- | --- |
| Si Target | DC Pulse Frequency | 100 kHz |
| | DC Pulse Width | 1856 ns |
| | DC Pulse Power | 2000 W |
| Co Target | High Frequency Power | 400 W |
| | High Frequency | 13.56 MHz |
| | Argon Flow Rate | 50 sccm |
| | Gas Pressure | $1.7$-$2.2 \times 10^{-1}$ Pa |
| | Forming Time | 172 min. |
| | Film Thickness | 6.5 μm |

The Co concentration of the prepared alloy thin film was found to be 30 weight %, when measured by fluorescent X-ray analysis. Also, the amorphous nature of the thin film was confirmed by X-ray diffraction analysis.

The obtained Si—Co thin film while carried on the current collector was cut into a 2.5 cm×2.5 cm size to provide a negative electrode a4.

(Preparation of Negative Electrode a5)

An amorphous Si—Fe alloy thin film was deposited on the same current collector as used in the preparation of the negative electrodes a3 and a4, using a dual source sputtering apparatus which was identical to the apparatus shown in FIG. 8, except that the Co sputter source was replaced by an Fe sputter source. Deposition of the amorphous Si—Fe alloy thin film was initiated by applying a DC pulse and a radio-frequency to the Si target and Fe target, respectively. Particular deposition conditions are shown in Table 9.

TABLE 9

| | | |
| --- | --- | --- |
| Si Target | DC Pulse Frequency | 100 kHz |
| | DC Pulse Width | 1856 ns |
| | DC Pulse Power | 2000 W |
| Fe Target | High Frequency Power | 300 W |
| | High Frequency | 13.56 MHz |
| | Argon Flow Rate | 50 sccm |
| | Gas Pressure | $1.7$-$2.2 \times 10^{-1}$ Pa |
| | Forming Time | 165 min. |
| | Film Thickness | 6.0 μm |

The Fe concentration of the prepared alloy thin film was found to be 17 weight %, when measured by fluorescent X-ray analysis. Also, the amorphous nature of the thin film was confirmed by X-ray diffraction analysis.

The obtained Si—Fe thin film while carried on the current collector was cut into a 2.5 cm×2.5 cm size to provide a negative electrode a5.

(Preparation of Positive Electrode)

Starting materials, $Li_2CO_3$ and $CoCO_3$, were weighed such that a ratio of numbers of Li and Co atoms, Li:Co, was brought to 1:1, and then mixed in a mortar. The mixture was pressed in a 17 mm diameter mold, fired in the air at 800° C. for 24 hours and then ground to obtain a positive active material having a mean particle diameter of 20 μm. The resulting positive active material, carbon as a conductor and polyvinylidene fluoride as a binder at a 90:5:5 ratio by weight, were added to N-methyl-2-pyrrolidone and then kneaded to prepare a cathode mix slurry.

The prepared slurry was coated on an aluminum foil as a current collector, dried and then calendered using a calender roll. The resultant was cut into a 20 mm×20 mm size to provide a positive electrode.

(Fabrication of Batteries)

The procedure of Experiment 1 was followed, except that the above-prepared positive electrode and negative electrodes a3, a4 and a5 were used, to fabricate batteries. The nonaqueous electrolytes a1 and b1 prepared in Experiment 1 were used.

The negative electrodes a3, a4 and a5 were respectively used in combination with the nonaqueous electrolyte a1 to fabricate rechargeable lithium batteries A3, A4 and A5.

The negative electrodes a3, a4 and a5 were respectively used in combination with the nonaqueous electrolyte b1 to fabricate rechargeable lithium batteries B3, B4 and B5.

(Charge-Discharge Cycle Test)

The thus-fabricated batteries A3-A5 and B3-B5 were subjected to a charge-discharge cycle test under the same conditions as in Experiment 1. Their discharge capacities and capacity retention rates on the 100th cycle and 200th cycle were shown in Table 10.

TABLE 10

| Battery | Maximum Discharge Capacity (mAh) | on 100-th Cycle | | on 200-th Cycle | |
|---|---|---|---|---|---|
| | | Discharge Capacity (mAh) | Capacity Retention (%) | Discharge Capacity (mAh) | Capacity Retention (%) |
| A3 | 11.17 | 9.89 | 88.5 | 8.66 | 77.5 |
| A4 | 11.45 | 10.3 | 90.0 | 9.55 | 83.4 |
| A5 | 12.30 | 10.8 | 87.9 | 9.96 | 80.8 |
| B3 | 12.17 | 2.14 | 17.6 | 0.58 | 4.80 |
| B4 | 12.0 | 5.32 | 44.3 | 1.06 | 8.86 |
| B5 | 11.67 | 3.85 | 33.0 | 0.78 | 6.68 |

As can be clearly seen from the results shown in Table 10, even in the case where silicon-cobalt and silicon-iron alloys are used as the negative active material, the batteries A4 and A5 using the nonaqueous electrolyte containing dissolved carbon dioxide, in accordance with the present invention, show marked capacity retention improvements, compared to the batteries B4 and B5 using the nonaqueous electrolyte in which carbon dioxide was not dissolved.

After 200 charge-discharge cycles, the batteries A4 and B4 were disassembled to remove their negative electrodes. A section of each negative electrode was observed using an SEM (scanning electron microscope) to measure a thickness of its noncrystalline silicon alloy thin film. The thickness measured for the noncrystalline silicon alloy thin film is shown in Table 11. In Table 11, the discharge capacity integrated over 200 cycles is also shown.

TABLE 11

| Battery | Integrated Discharge Capacity (mAh) | Thickness of Noncrystalline Silicon Thin Film (μm) |
|---|---|---|
| A4 | 1960 | 19 |
| B4 | 1191 | 28 |

As can be clearly seen from the results shown in Table 11, the noncrystalline silicon-cobalt alloy thin film in the battery A4 according to the present invention exhibits a much higher integrated discharge capacity than that in the battery B4, although its thickness increase is very small. The thickness increase of the thin film when using the noncrystalline silicon-cobalt alloy is smaller than when using the noncrystalline silicon, demonstrating that the effect of using carbon dioxide is more significant.

EXPERIMENT 3

(Preparation of Nonaqueous Electrolyte a6)

Under carbon dioxide atmosphere, 1 mole/liter of $LiClO_4$ was dissolved in a mixed solvent containing ethylene carbonate (EC) and diethyl carbonate (DEC) at a 3:7 ratio by volume. The resulting electrolyte solution was bubbled with carbon dioxide to dissolve carbon dioxide therein, so that a nonaqueous electrolyte a6 was prepared.

(Preparation of Nonaqueous Electrolyte b6)

Under argon atmosphere, 1 mole/liter of $LiClO_4$ was dissolved in a mixed solvent containing ethylene carbonate (EC) and diethyl carbonate (DEC) at a 3:7 ratio by volume to prepare a nonaqueous electrolyte b6.

(Preparation of Nonaqueous Electrolyte a7)

Under carbon dioxide atmosphere, 1 mole/liter of a fluorine-containing lithium borate derivative, $LiBF_2(O_x)$ (product of Central Glass Co., Ltd.), was dissolved in a mixed solvent containing ethylene carbonate (EC) and diethyl carbonate (DEC) at a 3:7 ratio by volume. The resulting electrolyte solution was bubbled with carbon dioxide to dissolve carbon dioxide therein, so that a nonaqueous electrolyte a7 was prepared.

(Preparation of Nonaqueous Electrolyte b7)

Under argon atmosphere, 1 mole/liter of $LiBF_2(O_x)$ was dissolved in a mixed solvent containing ethylene carbonate (EC) and diethyl carbonate (DEC) at a 3:7 ratio by volume to prepare a nonaqueous electrolyte b7.

(Fabrication of Batteries)

The procedure of Experiment 1 was followed, except that the positive electrode and the negative electrode a3, both prepared in Experiment 2, and the above-prepared nonaqueous electrolytes a6, a7, b6 and b7 were used, to fabricate batteries A6, A7, B6 and B7.

(Charge-Discharge Cycle Test)

The thus-fabricated rechargeable lithium batteries A6, A7, B6 and B7 were subjected to a charge-discharge cycle test under the same conditions as in Experiment 1. The test results are shown in Table 12. In Table 12, the results for the batteries A3 and B3 are also shown.

TABLE 12

| Battery | Maximum Discharge Capacity (mAh) | on 100-th Cycle | | on 200-th Cycle | |
|---|---|---|---|---|---|
| | | Discharge Capacity (mAh) | Capacity Retention (%) | Discharge Capacity (mAh) | Capacity Retention (%) |
| A3 | 11.17 | 9.89 | 88.5 | 8.66 | 77.5 |
| A6 | 12.45 | 8.78 | 70.5 | 6.18 | 49.6 |
| A7 | 11.13 | 8.98 | 80.7 | 8.01 | 72.0 |
| B3 | 12.17 | 2.14 | 17.6 | 0.58 | 4.80 |
| B6 | 11.74 | 4.57 | 38.1 | 1.94 | 16.2 |
| B7 | 12.01 | 8.78 | 73.1 | 4.42 | 36.8 |

As apparent from the results shown in Table 12, in the case where $LiPF_6$, $LiBF_2(O_x)$ and $LiClO_4$ are used as the solute for incorporation in the nonaqueous electrolyte, the batteries A3, A6 and A7 using the nonaqueous electrolyte containing dissolved carbon dioxide, in accordance with the present invention, show marked capacity retention improvements, compared to the batteries B3, B6 and B7 using the nonaqueous electrolyte in which carbon dioxide was not dissolved. The difference is marked particularly when the nonaqueous electrolyte contains the fluorine-containing compound.

EXPERIMENT 4

(Preparation of Nonaqueous Electrolytes a8-a10)

The nonaqueous electrolyte a1 (in which $CO_2$ was dissolved) and the nonaqueous electrolyte b1 (in which $CO_2$ was not dissolved), both prepared in Experiment 1, were mixed in the varied volume ratios within the range of 0:100-100:0, as specified in Table 13, to prepare nonaqueous electrolytes a8-a10.

TABLE 13

| Amount of Dissolved $CO_2$ Gas (wt. %) | Nonaqueous Electrolyte | b1 Content (vol. %) | a1 Content (vol. %) |
|---|---|---|---|
| 0.37 | a1 | 0 | 100 |
| 0.185 | a8 | 50 | 50 |
| 0.0925 | a9 | 75 | 25 |
| 0.037 | a10 | 90 | 10 |
| 0 | b1 | 100 | 0 |

(Fabrication of Batteries)

The procedure of Experiment 1 was followed, except that the positive electrode and the negative electrode a1, both prepared in Experiment 1, and the above-prepared nonaqueous electrolytes a8-a10 were used, to fabricate batteries A8-A10.

(Charge-Discharge Cycle Test)

The thus-fabricated rechargeable lithium batteries A8-A10 were subjected to a charge-discharge cycle test under the same conditions as in Experiment 1. The test results are shown in Table 14. In Table 14, the results for the batteries A1 and B1 are also shown.

TABLE 14

| Battery | Amount of Dissolved $CO_2$ Gas (wt. %) | Maximum Discharge Capacity (mAh) | on 100-th Cycle Discharge Capacity (mAh) | on 100-th Cycle Capacity Retention (%) |
|---|---|---|---|---|
| A1 | 0.37 | 11.17 | 9.89 | 88.5 |
| A8 | 0.185 | 12.5 | 9.67 | 77.4 |
| A9 | 0.0925 | 12.3 | 5.85 | 47.6 |
| A10 | 0.037 | 12.4 | 4.27 | 34.4 |
| B1 | 0 | 12.2 | 2.14 | 17.6 |

As can be clearly seen from Table 14, the batteries A1 and A8-A10 using the nonaqueous electrolyte containing dissolved carbon dioxide exhibit higher capacity retention rates than the comparative battery B1. As can also be appreciated, the amount of a carbon dioxide gas dissolved in the nonaqueous electrolyte is preferably at least 0.01% by weight, more preferably at least 0.1% by weight.

EXPERIMENT 5

(Preparation of Nonaqueous Electrolyte A11)

Under carbon dioxide atmosphere, 1 mole/liter of $LiPF_6$ was dissolved in a mixed solvent containing propylene carbonate (PC) and diethyl carbonate (DEC) at a 3:7 ratio by volume. The resulting electrolyte solution was bubbled with carbon dioxide so that carbon dioxide was dissolved therein to saturation. This resulted in the preparation of a nonaqueous electrolyte a11.

The amount of carbon dioxide dissolved in the nonaqueous electrolyte was 0.36 weight %, when measured in the same manner as in Experiment 1.

(Preparation of Nonaqueous Electrolytes a12-a14)

Under carbon dioxide atmosphere, vinylene carbonate (VC) was added to a mixed solvent containing ethylene carbonate (EC) and diethyl carbonate (DEC) at a 3:7 ratio by volume to prepare three different solvents containing vinylene carbonate in the respective amounts of 1%, 5% and 10%, based on the total weight of EC and DEC. Under carbon dioxide atmosphere, 1 mole/liter of $LiPF_6$ was dissolved in each solvent. These electrolyte solutions were each bubbled with carbon dioxide so that carbon dioxide was dissolved therein to saturation. As a result, nonaqueous electrolytes a12 (containing 1% by weight of VC), a13 (containing 5% by weight of VC) and a14 (containing 10% by weight of VC) were prepared.

The amount of dissolved carbon dioxide was 0.37% by weight for all nonaqueous electrolytes a12-a14, when measured in the same manner as in Experiment 1.

(Fabrication of Batteries)

The procedure of Experiment 1 was followed, except that the above-prepared nonaqueous electrolytes a11-a14 were used, to fabricate batteries A11-A14.

(Charge-Discharge Cycle Test)

The thus-fabricated rechargeable lithium batteries A11-A14 were subjected to a charge-discharge cycle test under the same conditions as in Experiment 1. Their discharge capacities and capacity retention rates on the 100th cycle and 300th cycle were shown in Table 15. In Table 15, the results for the batteries A1 and B1 are also shown.

TABLE 15

| Battery | Solvent | Maximum Discharge Capacity (mAh) | on 100-th Cycle Discharge Capacity (mAh) | on 100-th Cycle Capacity Retention (%) | on 300-th Cycle Discharge Capacity (mAh) | on 300-th Cycle Capacity Retention (%) |
|---|---|---|---|---|---|---|
| A1 | EC/DEC ($CO_2$ Present) | 11.17 | 9.89 | 88.5 | 3.52 | 31.5 |
| A11 | PC/DEC ($CO_2$ Present) | 12.57 | 10.55 | 83.9 | 7.77 | 61.8 |
| A12 | EC/DEC/ VC-1 wt. % ($CO_2$ Present) | 12.50 | 9.85 | 78.8 | 6.27 | 50.2 |
| A13 | EC/DEC/ VC-5 wt. % ($CO_2$ Present) | 12.17 | 9.64 | 79.2 | 4.85 | 39.9 |
| A14 | EC/DEC/ VC-10 wt. % ($CO_2$ Present) | 12.41 | 8.58 | 69.1 | 2.06 | 16.6 |
| B1 | EC/DEC ($CO_2$ Absent) | 12.17 | 2.14 | 17.6 | 0.16 | 1.3 |

As can be seen from Table 15, the charge-discharge cycle performance improving effect obtained by dissolving carbon dioxide in the nonaqueous electrolyte, becomes large when the nonaqueous electrolyte uses a mixed solvent containing ethylene carbonate or propylene carbonate as a cyclic solvent and diethyl carbonate as a chain carbonate.

As can also be seen from the results for the batteries A12-A14, satisfactory charge-discharge cycle performance characteristics are obtained even when vinylene carbonate is added to the mixed solvent of ethylene carbonate and diethyl carbonate. As can also be appreciated, the amount by weight of vinylene carbonate incorporated in the mixed solvent is preferably up to 10%, more preferably up to 5%, based on the total weight of the cyclic carbonate, excluding vinylene carbonate, and the chain carbonate.

EXPERIMENT 6

(Preparation of Nonaqueous Electrolytes a15-a19)

Under carbon dioxide atmosphere, 1 mole/liter of $LiPF_6$ was dissolved in a mixed solvent containing ethylene carbonate (EC) and diethyl carbonate (DEC) at the volume ratio specified below. The resulting solution was bubbled with carbon dioxide to dissolve carbon dioxide therein to saturation, thereby preparing nonaqueous electrolytes a15-a19.

nonaqueous electrolyte a15 EC:DEC=0:10
nonaqueous electrolyte a16 EC:DEC=1:9
nonaqueous electrolyte a17 EC:DEC=2:8
nonaqueous electrolyte a18 EC:DEC=5:5
nonaqueous electrolyte a19 EC:DEC=7:3.

(Preparation of Nonaqueous Electrolyte a20)

Under carbon dioxide atmosphere, 1 mole/liter of $LiPF_6$ was dissolved in a mixed solvent containing butylene carbonate (BC) and diethyl carbonate (DEC) at a 1:9 ratio by volume. The resulting solution was bubbled with carbon dioxide to dissolve carbon dioxide therein to saturation, thereby preparing a nonaqueous electrolyte a20.

(Preparation of Nonaqueous Electrolyte a21)

Under carbon dioxide atmosphere, 1 mole/liter of $LiPF_6$ was dissolved in a mixed solvent containing butylene carbonate (BC) and diethyl carbonate (DEC) at a 3:7 ratio by volume. The resulting solution was bubbled with carbon dioxide to dissolve carbon dioxide therein to saturation, thereby preparing a nonaqueous electrolyte a21.

(Preparation of Nonaqueous Electrolyte a22)

Under carbon dioxide atmosphere, 1 mole/liter of $LiPF_6$ was dissolved in a mixed solvent containing ethylene carbonate (EC) and dimethyl carbonate (DMC) at a 3:7 ratio by volume. The resulting solution was bubbled with carbon dioxide to dissolve carbon dioxide therein to saturation, thereby preparing a nonaqueous electrolyte a22.

(Preparation of Nonaqueous Electrolyte a23)

Under carbon dioxide atmosphere, 1 mole/liter of $LiPF_6$ was dissolved in a mixed solvent containing ethylene carbonate (EC) and methyl ethyl carbonate (MEC) at a 3:7 ratio by volume. The resulting solution was bubbled with carbon dioxide to dissolve carbon dioxide thereinto saturation, thereby preparing a nonaqueous electrolyte a23.

(Preparation of Nonaqueous Electrolyte a24)

Under carbon dioxide atmosphere, 1 mole/liter of $LiPF_6$ was dissolved in a mixed solvent containing 5 parts by weight of vinylene carbonate (VC) and 100 parts by weight of diethyl carbonate (DEC). The resulting solution was bubbled with carbon dioxide to dissolve carbon dioxide therein to saturation, thereby preparing a nonaqueous electrolyte a24.

(Preparation of Nonaqueous Electrolyte a25)

Under carbon dioxide atmosphere, 1 mole/liter of $LiPF_6$ was dissolved in a mixed solvent containing 5 parts by weight of vinylene carbonate (VC) and 100 parts by weight of dimethyl carbonate (DMC). The resulting solution was bubbled with carbon dioxide to dissolve carbon dioxide therein to saturation, thereby preparing a nonaqueous electrolyte a25.

(Preparation of Nonaqueous Electrolyte a26)

Under carbon dioxide atmosphere, 1 mole/liter of $LiPF_6$ was dissolved in a mixed solvent containing 5 parts by weight of vinylene carbonate (VC) and 100 parts by weight of methyl ethyl carbonate (MEC). The resulting solution was bubbled with carbon dioxide to dissolve carbon dioxide therein to saturation, thereby preparing a nonaqueous electrolyte a26.

(Fabrication of Batteries)

The procedure of Experiment 1 was followed, except that the above-prepared nonaqueous electrolytes a15-a26 were used, to fabricate batteries A15-A26.

(Charge-Discharge Cycle Test)

The thus-fabricated rechargeable lithium batteries A15-A26 were subjected to a charge-discharge cycle test under the conditions differed from those in Experiment 1. As preliminary cycling, each battery was charged and discharged three time at a constant current of 9.1 mA to a voltage range of 4.2-2.75 V. The next cycle was recorded as the first cycle. On the first and subsequent cycles, the battery was charged at a constant current of 9.1 mA to 4.2 V. After further constant-voltage charging (cut-off current of 0.45 mA), it was discharged at the constant current to 2.75 V. Its capacity retention rate on the 200th cycle was calculated from the following equation:

Capacity retention (%)=(200$th$-cycle discharge capacity)/(1$st$-cycle discharge capacity)×100.

The measurement results are shown in Tables 16-18. In Table 16, the result for the battery A1 is also shown.

TABLE 16

| Battery | Solvent | Capacity Retention on 200-th Cycle (%) |
|---------|---------|----------------------------------------|
| A15 | EC:DEC = 0:10 | 77 |
| A16 | EC:DEC = 1:9 | 76 |
| A17 | EC:DEC = 2:8 | 70 |
| A1 | EC:DEC = 3:7 | 66 |
| A18 | EC:DEC = 5:5 | 69 |
| A19 | EC:DEC = 7:3 | 68 |

The cycle performance characteristic increases slightly when the ethylene carbonate content is small (0.1-20 volume %) or relative large (50-70 volume %), as shown in Table 16.

Good cycle performance characteristics are obtained in the higher diethyl carbonate content range. This is probably because the higher diethyl carbonate content increases the amount of carbon dioxide that can be dissolved in the solvent, as can be inferred from the following.

The amount of carbon dioxide dissolved in an EC/DEC mixed solvent to saturation:
EC:DEC=1:9 0.42 weight %
EC:DEC=3:7 0.37 weight %
EC:DEC=5:5 0.32 weight %
EC:DEC=7:3 0.29 weight %.

TABLE 17

| Battery | Solvent | Capacity Retention on 200-th Cycle (%) |
|---------|---------|----------------------------------------|
| A20 | BC:DEC = 1:9 | 74 |
| A21 | BC:DEC = 3:7 | 68 |
| A22 | EC:DMC = 3:7 | 70 |
| A23 | EC:MEC = 3:7 | 72 |

Good cycle performance characteristics are obtained when butylene carbonate (BC) was used as the cyclic carbonate, as shown in Table 17. Good cycle performance characteristics are also obtained when dimethyl carbonate (DMC) and methyl ethyl carbonate (MEC) were used as the cyclic carbonate.

TABLE 18

| Battery | Solvent | Capacity Retention on 200-th Cycle (%) |
|---------|---------|----------------------------------------|
| A24 | DEC/VC-5 wt. % | 70 |
| A25 | DMC/VC-5 wt. % | 82 |
| A26 | MEC/VC-5 wt. % | 70 |

As can be seen from Table 18, good cycle performance characteristics are also obtained when diethyl carbonate (DEC), dimethyl carbonate (DMC) and methyl ethyl carbonate (MEC) are each mixed with vinylene carbonate (VC).

EXPERIMENT 7

(Preparation of Negative Electrode)

Copper was deposited by an electrolytic process on a surface of a heat-resisting, rolled copper alloy foil composed of a zirconium-copper alloy (zirconium content by weight of 0.03%) to provide a surface-roughened, heat-resisting copper alloy foil (having an arithmetic mean roughness Ra of 0.25 µm and a thickness of 31 µm) for use as a current collector. A noncrystalline silicon thin film was deposited on this current collector using the electron-beam deposition apparatus shown in FIG. 9.

Figure 9:
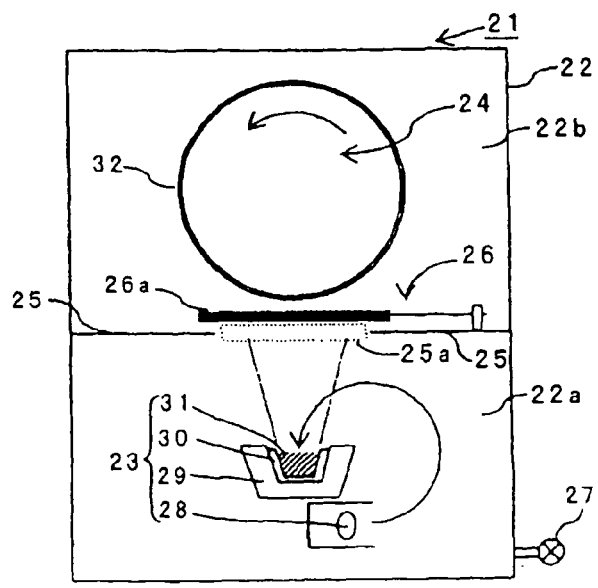
FIG. 9 is a schematic view, showing the electron-beam deposition apparatus employed in the Example in accordance with the present invention.

As shown in FIG. 9, the electron-beam deposition apparatus 21 includes a chamber 22, a deposition source 23, a rotary drum 24, a radiation heat shielding plate 25, a shutter 26 and a vacuum evacuation apparatus 27. An interior of the chamber 22 is partitioned by the radiation heat shielding plate 25 to provide a room 22a for installing the deposition source 23 and a room 22b located above the deposition source 23 for installing the rotary drum 24. The deposition source 23 is comprised of an electron gun 28, a crucible 29, a hearth liner 30 and a deposition material 31. The electron gun 28 is operable to emit an electron beam sufficient to heat and evaporate the deposition material 31. The crucible 29 is covered with the carbon hearth liner 30 which collects the deposition material 31. The rotary drum 24 is constructed such that it rotates in a predetermined direction and can be cooled by passing circulating water through an interior of the rotary drum. The current collector 32 is mounted on a peripheral surface of the rotary drum 24. The radiation heat shielding plate 25, made of stainless steel, serves to retard transfer of a radiation heat generated at the deposition source 23 to the current collector 32. The radiation heat shielding plate 25 has at its center an opening 25a which can be closed by the shutter 26. The shutter 26 has a stainless steel covering plate 26a which is movable to a position where the opening 25a is completely covered and thus closed.

As described above, a noncrystalline silicon thin film was deposited on the current collector using the electron-beam deposition apparatus shown in FIG. 9. An interior of the chamber was vacuum evacuated to $1 \times 10^{-4}$ Pa. While the shutter was closed, the deposition material was irradiated with an electron beam for 10 minutes so that it was thermally melted and its interior gas was removed. Concurrently, the crucible, hearth liner, inner walls of the chamber, radiation heat shielding plate and shutter were exposed to a radiation heat from the deposition material, so that impurities incorporated therein by absorption and adsorption, such as oxygen and moisture, were released. Then, the electron beam irradiation was stopped to allow them to stand and release heat, while an interior of the room was continuously evacuated using the vacuum evacuation apparatus.

After they were cooled sufficiently, a noncrystalline silicon thin film was deposited on the current collector under the thin film deposition conditions specified in Table 19. In the deposition of the thin film, the shutter was opened after the deposition material melted completely.

TABLE 19

| | |
|---|---|
| Deposition Material | Silicon (99.999% Pure) |
| Current Collector | Surface-Roughened Heat-Resisting Rolled Copper Alloy (Zirconium-Copper Alloy) Foil |
| Electron Beam Power | 4.7 kW |
| Deposition Time | 15 min. |
| Thickness of Si Film | 6 µm |

The obtained thin film while carried on the current collector was cut into a 2.5 cm×2.5 cm size. The subsequent attachment of a negative tab resulted in preparation of a negative electrode a27.

(Fabrication of Batteries)

The procedure of Experiment 1 was followed, except that the above-prepared negative electrode a27 and the nonaqueous electrolyte a1 containing dissolved $CO_2$ in Experiment 1 were used, to fabricate a battery A27.

The procedure of Experiment 1 was followed, except that the above-prepared negative electrode a27 and the nonaqueous electrolyte b1 in which $CO_2$ was not dissolved in Experiment 1 were used, to fabricate a battery B8.

The procedure of Experiment 1 was followed, except that the above-prepared negative electrode a27 and the nonaqueous electrolyte b2 containing 20% by weight of vinylene carbonate (VC) in Experiment 1 were used, to fabricate a battery B9.

(Charge-Discharge Cycle Test)

Figure 10:
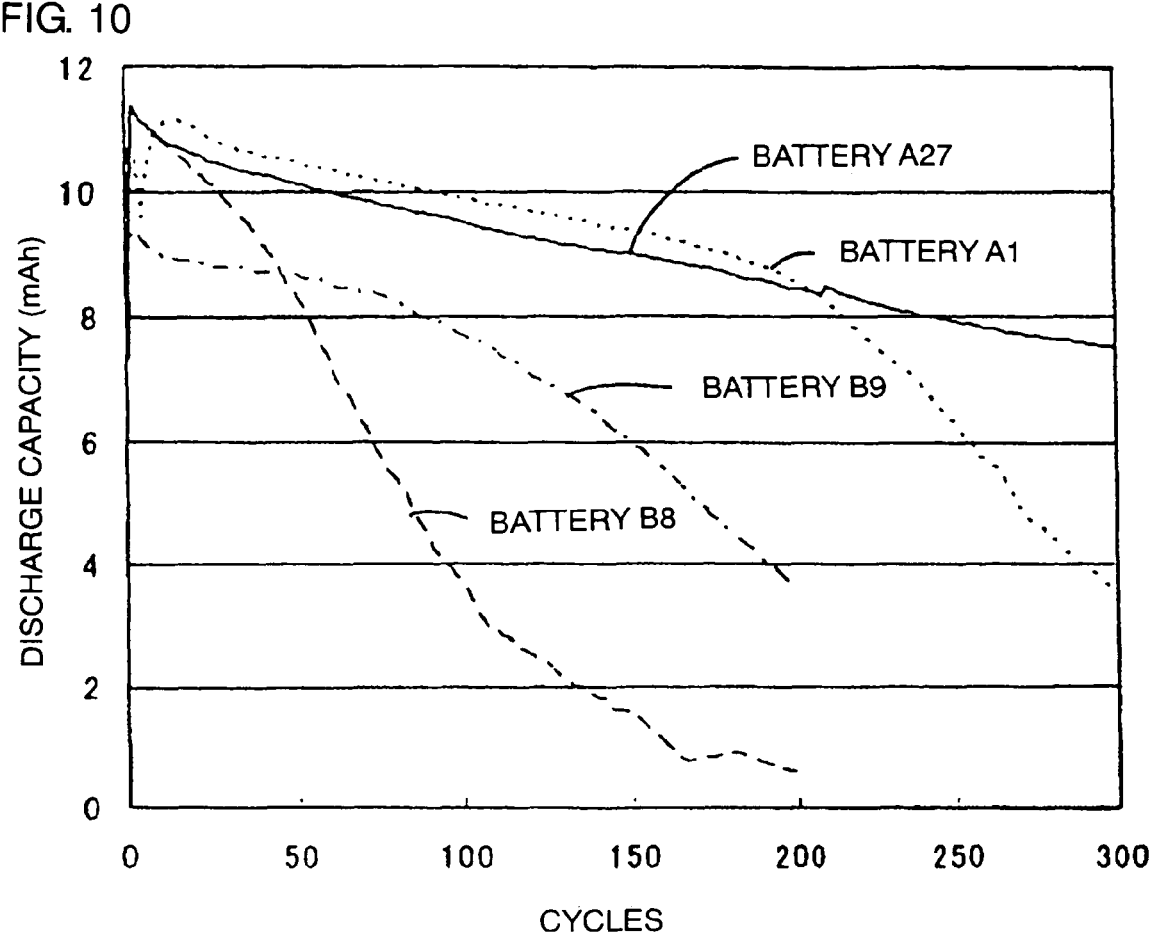
FIG. 10 is a graph, showing the relationship between charge capacity and cycles of the rechargeable lithium battery in the Example in accordance with the present invention.

The thus-fabricated rechargeable lithium batteries A27, B8 and B9, as well as the battery A1 in Experiment 1, were subjected to a charge-discharge cycle test under the same conditions as in Experiment 1. Their discharge capacities and capacity retention rates on the 100th cycle, 200th cycle and 300th cycle were shown in Table 20. The relationship between cycles and the discharge capacity, for each battery, is shown in FIG. 10. For the batteries B8 and B9, the testing was discontinued after 200 cycles. For the batteries A27 and A1, the testing was discontinued after 300 cycles.

TABLE 20

| | Maximum | on 100-th Cycle | | on 200-th Cycle | | on 300-th Cycle | |
|---|---|---|---|---|---|---|---|
| Battery | Discharge Capacity (mAh) | Discharge Capacity (mAh) | Capacity Retention (%) | Discharge Capacity (mAh) | Capacity Retention (%) | Discharge Capacity (mAh) | Capacity Retention (%) |
| A27 | 11.38 | 9.54 | 83.8 | 8.46 | 74.3 | 7.51 | 66.0 |
| A1 | 11.17 | 9.89 | 88.5 | 8.66 | 77.5 | 3.52 | 31.5 |
| B8 | 11.26 | 3.64 | 32.3 | 0.59 | 5.2 | Experiment Discontinued | |
| B9 | 9.62 | 7.70 | 83.9 | 3.6 | 37.4 | Experiment Discontinued | |

As can be clearly seen from Table 20 and FIG. 10, the batteries A27 and A1 in accordance with the present invention exhibits good charge-discharge performance characteristics. As apparent from the comparison between the batteries A27 and A1, the battery A 27 having the thin film formed by an evaporation process shows better charge-discharge performance characteristics.

Table 21 shows the integrated discharge capacity of each battery, which is a total discharge capacity integrated over the entire cycles in the cycle test, and the thickness change of its electrode prior to and subsequent to charge-discharge cycling, when measured by a micrometer.

TABLE 21

| Battery | Integrated Discharge Capacity (mAh) | Thickness Change of Electrode Before and After Cycling (μm) |
|---|---|---|
| A27 | 2.711 | +12 |
| A1 | 2.586 | +21 |
| B8 | 0.945 | +57 |
| B9 | 1.437 | +45 |

As can be clearly seen from Table 21, the batteries A27 and A1 in accordance with the present invention show higher integrated discharge capacities and their electrodes show smaller thickness increase. As apparent from the comparison between the batteries A27 and A1, the battery A 27 having the thin film formed by an evaporation process exhibits a higher integrated discharge capacity and a smaller change in thickness of its electrode. Because the integrated discharge capacity is nearly proportional to the amount of lithium that is stored and released over 300 cycles, more lithium must have been stored and released in the battery A27 than in the battery A1. Nevertheless, the thickness increase of the electrode that results from the porosity increase inside the thin film has been more suppressed in the battery A27 than in the battery A1.

(Fabrication of Three-Electrode Beaker Cell)

Figure 11:
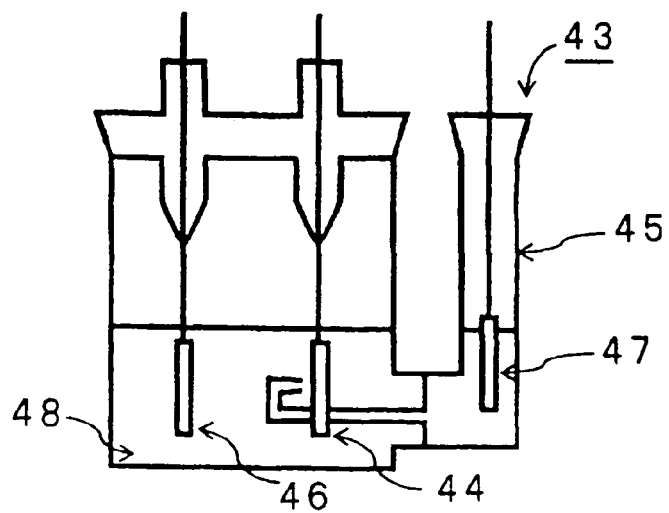
FIG. 11 is a schematic view, showing the three-electrode beaker cell constructed in the Example in accordance with the present invention.

The three-beaker cell shown in FIG. 11 was fabricated using the negative electrode a27 and the negative electrode a1 (used in the battery A1). The negative electrode a27 or a1 was placed in a container 45 to serve as a working electrode 44. A counter electrode 46, formed from metallic lithium, and a reference electrode 47 were placed in the container 45. A nonaqueous electrolyte solution 48 was then introduced into the container 45 to obtain a beaker cell 43. The nonaqueous electrolyte b1 in Experiment 1, in which $CO_2$ was not dissolved, was used as the nonaqueous electrolyte solution 48.

A charge-discharge test was conducted using the thus-fabricated beaker cell. This cell was charged at a constant current of 4 mA until a potential of the working electrode 44 reached 0 V versus a standard potential of the reference electrode 47, and then discharged at the constant current until the working electrode 44 potential increased to 2.0 V. This charge-discharge cycle was recorded as a unit cycle. Charge-discharge cycling was discontinued after 10 cycles. A maximum discharge capacity, among those measured over 10 cycles, was divided by an electrode area to give a maximum discharge capacity per unit area, which value was further divided by a film thickness to give a maximum discharge capacity per unit volume. The maximum discharge capacity per unit area and the maximum discharge capacity per unit volume, for each of the electrodes a27 and a1, are shown in Table 22.

TABLE 22

| Battery | Maximum Areal Discharge Capacity When Measured Using Three-Electrode Cell (mAh/cm$^2$) | Maximum Areal Discharge Capacity/Film Thickness (Maximum Discharge Capacity Per Unit Volume) (mAh/cm$^2$μm) |
|---|---|---|
| a27 (Electron-Beam Evaporation) | 3.81 | 0.63 |
| a1 (Sputtering) | 3.82 | 0.76 |

As can be clearly seen from the results shown in Table 22, the electrode a27 having the thin film formed by an electron beam evaporation process exhibits a lower discharge capacity relative to the electrode a1 having the thin film formed by a sputtering process. This follows that a smaller amount of lithium is stored and released per unit volume of the electrode. It is therefore believed that the former electrode is less susceptible to volume change when it stores and releases lithium. This probably explains the small change in thickness of the electrode prior to and subsequent to cycling, which is shown in Table 21.

The electrode 27a exhibits better cycle performance characteristics than the electrode a1. This is most probably due to the small volumetric change that reduces the occurrence of the noncrystalline silicon to shed from the current collector and lowers a possibility of destruction of a stable protective film formed on a surface of the noncrystalline silicon. It is therefore comprehended that the maximum discharge capacity per unit volume of the active material thin film is preferably brought within 0.7 mAh/cm$^2$μm in order to fully attain the effect of carbon dioxide dissolved in the nonaqueous electrolyte.

The invention claimed is:

1. A rechargeable lithium battery including a negative electrode made by depositing a noncrystalline thin film composed entirely or mainly of silicon on a current collector, a positive electrode and a nonaqueous electrolyte, characterized in that said nonaqueous electrolyte contains added carbon dioxide dissolved therein in addition to carbon dioxide formed during fabrication of the battery, whereby an increase in porosity of said thin film during charge and discharge is suppressed, that said noncrystalline thin film is divided into columns by gaps extending in the thickness direction of the film, and that a film containing lithium fluoride is formed on said divided noncrystalline thin film.

2. The rechargeable lithium battery as recited in claim 1, characterized in that the amount of added carbon dioxide dissolved in said nonaqueous electrolyte is at least 0.001 weight %.

3. The rechargeable lithium battery as recited in claim 1, characterized in that the amount of added carbon dioxide dissolved in said nonaqueous electrolyte is at least 0.01 weight %.

4. The rechargeable lithium battery as recited in claim 1, characterized in that the amount of added carbon dioxide dissolved in said nonaqueous electrolyte is at least 0.1 weight %.

5. The rechargeable lithium battery as recited in claim 1, characterized in that a surface of said current collector has an arithmetic mean roughness Ra of at least 0.1 μm.

6. The rechargeable lithium battery as recited in claim 1, characterized in that said current collector comprises a heat-resisting copper alloy foil.

7. The rechargeable lithium battery as recited in claim 6, characterized in that said current collector comprises a heat-resisting copper alloy foil having an electrolytic copper or copper alloy surface layer.

8. The rechargeable lithium battery as recited in claim 1, characterized in that said noncrystalline thin film composed mainly of silicon contains at least one of cobalt and iron.

9. The rechargeable lithium battery as recited in claim 1, characterized in that said nonaqueous electrolyte contains a fluorine-containing compound or $LiClO_4$.

10. The rechargeable lithium battery as recited in claim 9, characterized in that said fluorine-containing compound is $LiXF_y$ (wherein X is P, As, Sb, B, Bi, Al, Ga or In; y is 6 if X is P, As or Sb and y is 4 if X is B, Bi, Al, Ga or In);
   LiN $(C_mF_{2m+1},SO_2)$ $(C_nF_{2n+1}SO_2)$ (wherein m and n are independently integers of 1-4); or a fluorine-containing lithium borate derivative.

11. The rechargeable lithium battery as recited in claim 10, characterized in that said fluorine-containing lithium borate derivative is $LiBF_2(O_x)$.

12. The rechargeable lithium battery as recited in claim 1, characterized in that said nonaqueous electrolyte contains cyclic carbonate and chain carbonate.

13. The rechargeable lithium battery as recited in claim 1, characterized in that a solvent of said nonaqueous electrolyte is a mixed solvent of cyclic carbonate and chain carbonate.

14. The rechargeable lithium battery as recited in claim 12, characterized in that at least one of ethylene carbonate and propylene carbonate is contained as said cyclic carbonate.

15. The rechargeable lithium battery as recited in claim 12, characterized in that diethyl carbonate is contained as said chain carbonate.

16. The rechargeable lithium battery as recited in claim 12, characterized in that cyclic carbonate having an unsaturated carbon bond and another cyclic carbonate are contained as said cyclic carbonate.

17. The rechargeable lithium battery as recited in claim 16, characterized in that said cyclic carbonate having an unsaturated carbon bond is vinylene carbonate.

18. The rechargeable lithium battery as recited in claim 16, characterized in that a content by volume of said cyclic carbonate, excluding the cyclic carbonate having an unsaturated carbon bond, does not exceed 70%, based on the total volume of the cyclic carbonate, excluding the cyclic carbonate having an unsaturated carbon bond, and the chain carbonate.

19. The rechargeable lithium battery as recited in claim 16, characterized in that a content by volume of said cyclic carbonate, excluding the cyclic carbonate having an unsaturated carbon bond, is 0.1-20%, based on the total volume of the cyclic carbonate, excluding the cyclic carbonate having an unsaturated carbon bond, and the chain carbonate.

20. The rechargeable lithium battery as recited in claim 16, characterized in that a content by volume of said cyclic carbonate, excluding the cyclic carbonate having an unsaturated carbon bond, is 50-70%, based on the total volume of the cyclic carbonate, excluding the cyclic carbonate having an unsaturated carbon bond, and the chain carbonate.

21. The rechargeable lithium battery as recited in claim 16, characterized in that a content by weight of said cyclic carbonate having an unsaturated carbon bond is 0.1-10%, based on the total weight of the other cyclic carbonate and the chain carbonate.

22. The rechargeable lithium battery as recited in claim 1, characterized in that said noncrystalline thin film is formed by an evaporation process.

* * * * *